(12) United States Patent
Chilom et al.

(10) Patent No.: US 12,283,842 B2
(45) Date of Patent: Apr. 22, 2025

(54) POWER MANAGEMENT SYSTEMS, DEVICES, AND METHODS

(71) Applicant: CRESCONET, LLC, Sausalito, CA (US)

(72) Inventors: Marius Chilom, Smyrna, GA (US); Szabolcs Zigovszki, Smyrna, GA (US); John Stafford, Avon, IN (US)

(73) Assignee: CRESCONET, LLC, Sausalito, CA (US)

( * ) Notice: Subject to any disclaimer, the term of this patent is extended or adjusted under 35 U.S.C. 154(b) by 0 days.

(21) Appl. No.: 18/897,907

(22) Filed: Sep. 26, 2024

(65) Prior Publication Data

US 2025/0023381 A1 Jan. 16, 2025

Related U.S. Application Data

(63) Continuation of application No. PCT/US2023/033151, filed on Sep. 19, 2023.
(Continued)

(51) Int. Cl.
*H02J 7/35* (2006.01)
*H02J 7/34* (2006.01)

(52) U.S. Cl.
CPC ............... *H02J 7/35* (2013.01); *H02J 7/345* (2013.01); *H02J 2207/50* (2020.01)

(58) Field of Classification Search
CPC ....................................................... H02J 7/35
(Continued)

(56) References Cited

U.S. PATENT DOCUMENTS 5,602,744 A 2/1997 Meek et al.
5,874,903 A 2/1999 Shuey et al.
(Continued)

FOREIGN PATENT DOCUMENTS

| CN | 213041317 U | 4/2021 |
| CN | 213717659 U | 7/2021 |
| WO | 2020/081142 A1 | 4/2020 |

OTHER PUBLICATIONS

International Searching Authority (ISA/US). International Search Report and Written Opinion issued in PCT/US2023/033151. Jan. 3, 2024. 10 pages.

*Primary Examiner* — Yalkew Fantu
(74) *Attorney, Agent, or Firm* — Meunier Carlin & Curfman LLC

(57) ABSTRACT

A Radio Transceiver is described herein, which according to one embodiment, includes a solar panel, a battery and an advanced power management circuit operably connected to the solar panel and the battery. The advanced power management circuit is configured to receive electrical energy from the solar panel and the battery. A supercapacitor is operably connected to the advanced power management circuit and configured to receive electrical energy from the advanced power management circuit. A communications module is coupled to the supercapacitor. The Radio Transceiver can be powered by measuring a supercapacitor voltage using the advanced power management circuit; determining whether the supercapacitor voltage is above a first threshold voltage and below a second threshold voltage; and charging the supercapacitor using at least one of the solar panel and the battery based on whether the supercapacitor voltage is above the first threshold voltage and below the second threshold voltage.

18 Claims, 29 Drawing Sheets

Related U.S. Application Data

(60) Provisional application No. 63/410,956, filed on Sep. 28, 2022.

(58) Field of Classification Search
USPC .......................................................... 320/166
See application file for complete search history.

(56) References Cited

U.S. PATENT DOCUMENTS

| | | |
|---|---|---|
| 6,995,685 B2 | 2/2006 | Randall |
| 7,692,411 B2 | 4/2010 | Trainor et al. |
| 7,772,720 B2 | 8/2010 | McGee et al. |
| 7,830,038 B2 | 11/2010 | Wang |
| 7,982,439 B2 | 7/2011 | Trainor et al. |
| 8,779,625 B2 | 7/2014 | Work et al. |
| 9,279,701 B2 | 3/2016 | Balzano et al. |
| 9,435,665 B2 | 9/2016 | Aiken |
| 11,264,807 B2 | 3/2022 | White |
| 11,297,667 B2 * | 4/2022 | Sharma ............... H04W 36/033 |
| 11,309,727 B2 | 4/2022 | Ramirez |
| 11,322,964 B2 | 5/2022 | Shijie et al. |
| 2002/0041237 A1 | 4/2002 | Nathan |
| 2005/0206530 A1 | 9/2005 | Cumming et al. |
| 2006/0197507 A1 * | 9/2006 | Wang ..................... H02J 7/345 |
| | | 320/166 |
| 2019/0202385 A1 | 7/2019 | Lo et al. |
| 2020/0081142 A1 | 3/2020 | Shutler et al. |
| 2020/0328601 A1 * | 10/2020 | Li ....................... H01M 10/425 |
| 2020/0395627 A1 | 12/2020 | Kilburn et al. |
| 2021/0376652 A1 | 12/2021 | Luangrath et al. |
| 2022/0140624 A1 * | 5/2022 | Shread ..................... H02J 7/35 |
| | | 320/165 |

* cited by examiner

Solar panel →

380

Plastic housing →

382
384

PCBA assembly →

Cable assembly →

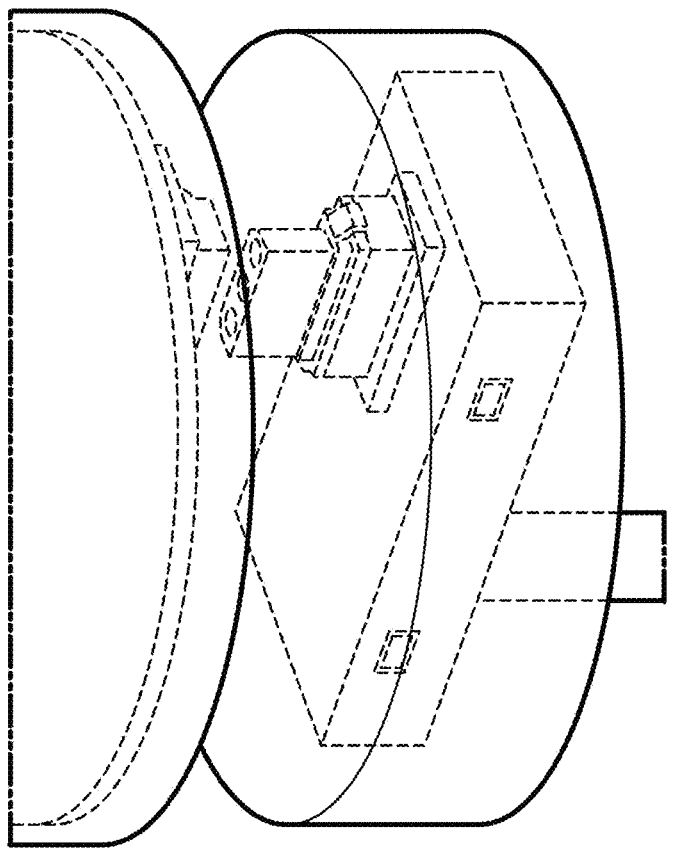
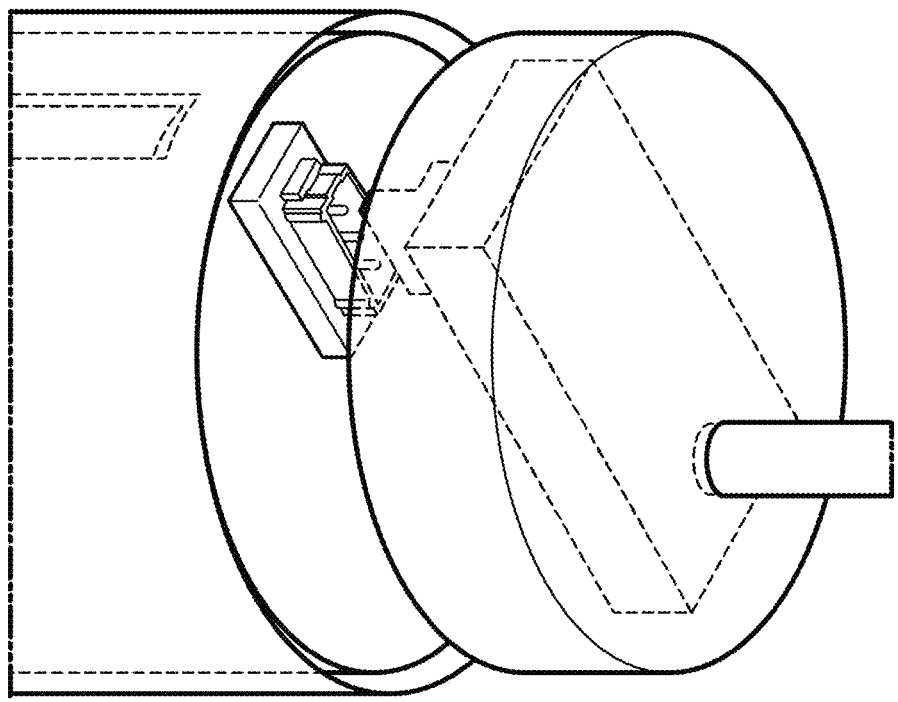
FIG. 3H
FIG. 3G

Channels can be added on the top profile design to allow the flexibility required for heavy traffic overpassing the unit. This way the integrity of the enclosure and electronics is maintained.

POWER MANAGEMENT SYSTEMS, DEVICES, AND METHODS

CROSS-REFERENCE TO RELATED APPLICATIONS

This application is a continuation application of PCT/US2023/033151, filed Sep. 19, 2023, which claims the benefit of priority to U.S. Provisional Application No. 63/410,956 filed on Sep. 28, 2022, and entitled POWER MANAGEMENT SYSTEMS, DEVICES, AND METHODS, which is hereby incorporated herein by reference in its entirety.

BACKGROUND

Devices for measurement, sensing, and/or control often use Radio Transceivers to communicate with other devices and systems. These device often require a power source for the Radio Transceiver, any computing included computing devices and/or the sensors.

For example, in the utility industry, devices with Radio Transceivers are used to provide RF communications to head end systems by reading utility meters that measure utility services provided to customers. Examples of utility services include water and gas service to homes and businesses. Examples of utility meters include water meters and gas meters. Water meters can measure the amount of water provided to a customer. Similarly, gas meters can measure the amount of a gas (e.g., natural gas, propane, butane, etc.) provided to a customer. After the commodities provided are measured by a separate and stand alone utility metering device, the Radio Transceiver can store or transmit the measurement of the amount of commodities provided. For example, the measurement of the amount of commodities provided can be recorded and used to bill customers of utility services, and provide alarms, alerts and other environmental data.

Radio Transceivers can be powered by batteries over a long duration (e.g., multiple years). Therefore, what is needed are systems and methods adapted to powering Radio transceivers to allow the radio transceiver to remain in the service environment as long as possible. Improved systems and methods for powering Radio Transceivers can also benefit safety and security by allowing for Radio Transceivers and sensors to be deployed to more locations. It is with these and other considerations that implementations of the present disclosure are directed.

SUMMARY

In some aspects, the techniques described herein relate to a system including: a cylindrical housing including an inner surface and an outer surface; a plurality of screw threads on the outer surface of the cylindrical housing; a nut configured to attach to the plurality of screw threads, the nut including a plurality of protuberances; a solar panel positioned on the outer surface of the housing; a battery positioned inside the housing; an advanced power management circuit positioned inside the housing, the advanced power management circuit including a first printed circuit board and a second printed circuit board separated by a thermoplastic insulation layer; wherein the advanced power management circuit is operably connected to the solar panel and the battery and configured to receive electrical energy from at least one of the solar panel and the battery; a layer of overmolded material positioned in a space between the inner surface of the cylindrical housing and the first/second circuit board; a supercapacitor positioned inside the housing and operably connected to the advanced power management circuit, wherein the supercapacitor is configured to receive electrical energy from the advanced power management circuit; and the advanced power management circuit is configured to measure a voltage of the supercapacitor; and a communications module operatively coupled to the supercapacitor.

In some aspects, the techniques described herein relate to a computer implemented, the method including: measuring a supercapacitor voltage using the advanced power management circuit; determining whether the supercapacitor voltage is above a first threshold voltage and below a second threshold voltage; and charging the supercapacitor using at least one of the solar panel and the battery based on whether the supercapacitor voltage is above the first threshold voltage and below the second threshold voltage.

In some aspects, the techniques described herein relate to a system, wherein the supercapacitor includes a capacitor, a hybrid layer capacitors ("HLC") and/or ultracapacitors.

In some aspects, the techniques described herein relate to a system including: a housing including an inner surface and an outer surface; a cover having an opening, the housing received in the opening and attached to the cover; a solar panel positioned on the outer surface of the housing; a battery positioned inside the housing; an advanced power management circuit positioned inside the housing, the advanced power management circuit including a first printed circuit board and a second printed circuit board separated by a thermoplastic insulation layer; wherein the advanced power management circuit is operably connected to the solar panel and the battery and configured to receive electrical energy from at least one of the solar panel and the battery; a capacitor positioned inside the housing and operably connected to the advanced power management circuit, wherein the supercapacitor is configured to receive electrical energy from the advanced power management circuit; and the advanced power management circuit is configured to measure a voltage of the supercapacitor; and a communications module operatively coupled to the supercapacitor.

In some aspects, the techniques described herein relate to a system, further including a layer of overmolded material positioned in a space between the inner surface of the housing and the first/second printed circuit board.

In some aspects, the techniques described herein relate to a system, wherein the housing is attached to the cover via ultrasonic welding.

In some aspects, the techniques described herein relate to a system, wherein the capacitor includes a supercapacitor, a hybrid layer capacitors ("HLC") and/or ultracapacitors.

In some aspects, the techniques described herein relate to a computer implemented method 4-7, the method including: measuring a capacitor voltage using the advanced power management circuit; determining whether the capacitor voltage is above a first threshold voltage and below a second threshold voltage; and charging the capacitor using at least one of the solar panel and the battery based on whether the capacitor voltage is above the first threshold voltage and below the second threshold voltage.

In some aspects, the techniques described herein relate to a system including: a housing including an inner surface and an outer surface; a cover having an opening, the housing received in the opening and attached to the cover; a solar panel positioned on the outer surface of the housing; a battery positioned inside the housing; an advanced power management circuit positioned inside the housing, the advanced power management circuit including a first printed circuit board and a second printed circuit board separated by a thermoplastic insulation layer; wherein the advanced power management circuit is operably connected to the solar panel and the battery and configured to receive electrical energy from at least one of the solar panel and the battery; a capacitor positioned inside the housing and operably connected to the advanced power management circuit, wherein the capacitor is configured to receive electrical energy from the advanced power management circuit; and the advanced power management circuit is configured to measure a voltage of the supercapacitor; and a sensor module operatively coupled to the supercapacitor.

In some aspects, the techniques described herein relate to a system, wherein the sensor module includes at least one of a camera or a microphone.

In some aspects, the techniques described herein relate to a system or claim 10, wherein the sensor module includes a contact sensor.

In some aspects, the techniques described herein relate to a system, wherein the sensor module includes a chemical sensor.

In some aspects, the techniques described herein relate to a system, further including an actuator.

In some aspects, the techniques described herein relate to a system, wherein the actuator is a servo motor.

In some aspects, the techniques described herein relate to a system, further including a communication module operatively coupled to the supercapacitor.

In some aspects, the techniques described herein relate to a system, wherein the communication module is operatively coupled to the sensor module.

In some aspects, the techniques described herein relate to a system, wherein the communication module is configured to transmit information from the sensor module.

In some aspects, the techniques described herein relate to a system, further including an alarm.

In some aspects, the techniques described herein relate to a system, wherein the alarm is configured to activate based on an output of the sensor module.

In some aspects, the techniques described herein relate to a system or claim 19, wherein the alarm is configured to activate based on an output of the communication module.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 1A illustrates an advanced power management system, solar panel, battery, and supercapacitor, according to an implementation of the present disclosure. FIG. 1B illustrates a Radio Transceiver including a register, power system, and communications module. FIG. 1C illustrates an advanced power management system, solar panel, battery, and supercapacitor, according to an example implementation of the present disclosure.

FIG. 2A illustrates threshold values that can be used to control the power flow to the supercapacitor. FIG. 2B illustrates a method for controlling a power system, according to several embodiments of the disclosure.

FIGS. 3A-3H illustrate Radio Transceivers suitable for implementing several embodiments of the disclosure. FIG. 3A illustrates a perspective view of a Radio Transceiver with a solar panel according to an example embodiment of the present disclosure. FIG. 3B illustrates a cutaway perspective view of a Radio Transceiver, according to an example embodiment of the present disclosure. FIG. 3C illustrates perspective views of a Radio Transceiver according to yet another an example embodiment of the present disclosure. FIG. 3D illustrates a perspective exploded view of a Radio Transceiver according to an example embodiment of the present disclosure; FIG. 3E illustrates a side view of a Radio Transceiver according to an example embodiment of the present disclosure. FIG. 3F illustrates an exploded perspective view of a Radio Transceiver according to an example embodiment of the present disclosure. FIG. 3G illustrates a perspective view of a connection between a PCBA and cable assembly. FIG. 3H illustrates a perspective view of a connection between a PCBA and a cable assembly.

FIG. 4A is a side view of a printed circuit board assembly including overmolding. FIG. 4B is a perspective view of a PCB assembly including overmolding. FIG. 4C illustrates an exploded view of a printed circuit board assembly including overmolding. FIG. 4D illustrates cable assemblies. FIG. 4E illustrates an exploded view of cable assemblies.

FIG. 5A illustrates a schematic of a printed circuit board. FIG. 5B illustrates a top view of a schematic of another printed circuit board. FIG. 5C illustrates a bottom view of the printed circuit board illustrated in FIG. 5B.

FIG. 7A illustrates a block diagram of a system including an advanced power management system, solar panel, high capacity battery, and hybrid rechargeable battery/Supercapacitor. FIG. 7B illustrates an example circuit schematic that can be used to implement embodiments according to the present disclosure. FIG. 7C illustrates an example circuit schematic that can be used to implement embodiments according to the present disclosure. FIG. 7D illustrates an arrangement of circuit boards and thermoplastic, according to an embodiment of the present disclosure. FIG. 7E illustrates an enclosure with vents and an overmolded assembly, according to an embodiment of the present disclosure. FIG. 7F illustrates an embodiment according to the present disclosure including an intrusion sensor. FIG. 7G illustrates channels that can be formed on top of the enclosure to increase the flexibility of the enclosure. FIG. 7H illustrates a threaded enclosure and a nut configured to attach to the threaded enclosure.

DETAILED DESCRIPTION

Figure 1A:
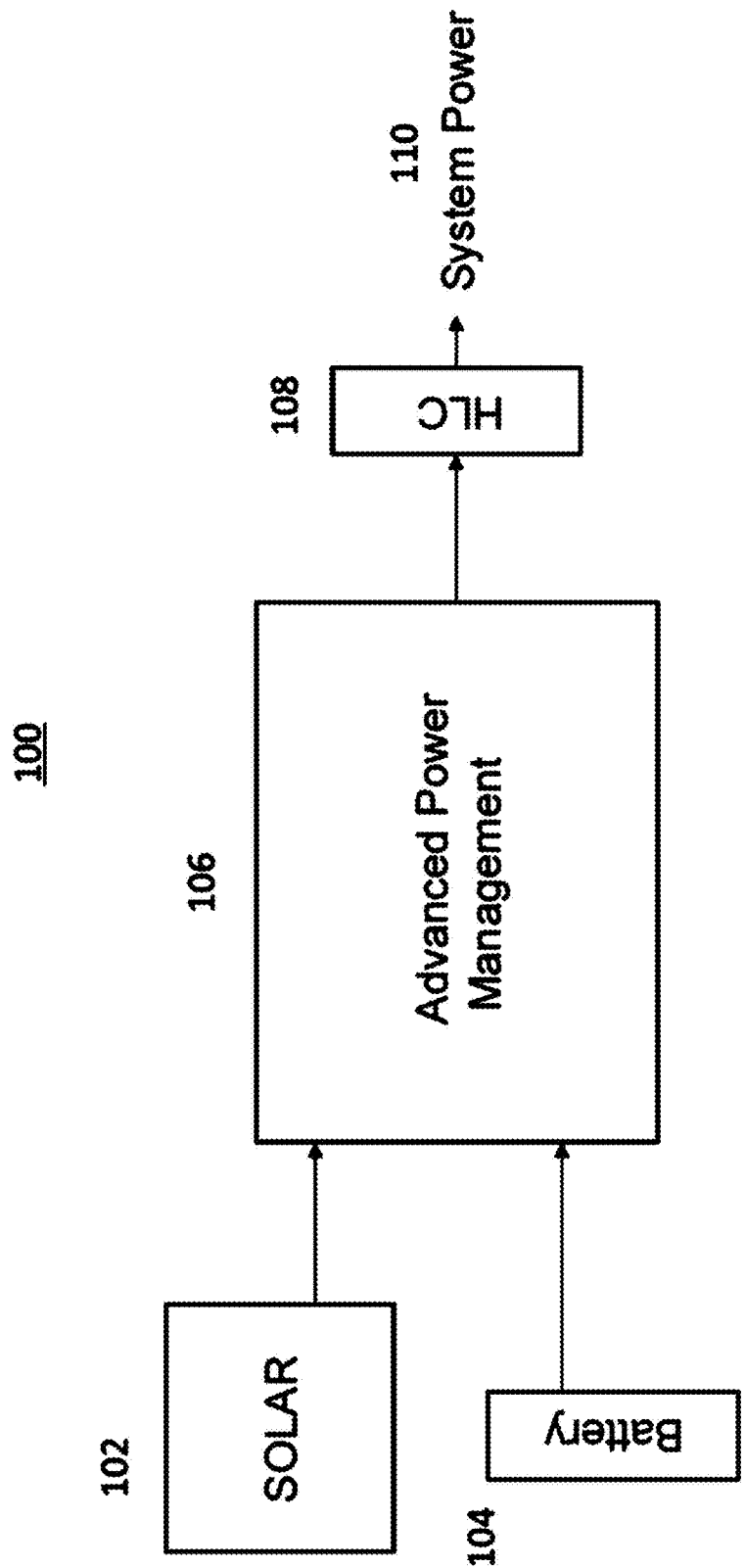
FIGS. 1A-1C illustrate a system block diagrams suitable for implementing several embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C". Although various dimensions may be described herein, the dimensions are not intended to be limiting of the disclosure.

Embodiments of the disclosure are directed to systems, methods, and devices for powering a communication module for a Radio Transceiver. The Radio Transceiver including a combination solar and battery harmonized by a common supercapacitor can also be applied to other commercial and industrial applications to report measurements including consumption, level, flow, temperature, particulate concentrations, and more. Non-limiting examples of potential uses for a Radio Transceiver in industrial applications include:

Propane Monitoring, Alert and Control.
Steam System Monitoring Alert and Control.
HVAC System Monitoring Alert and Control.
Transportation Monitoring, Alert, and Control. Truck, Rail, and Other.
Refrigeration Monitoring, Alert, and Control. Fixed and In Transit.
Environmental Monitoring, Alert, and Control. Reservoir, Smokestack, Other.
Tank Level Monitoring, Alert, and Control. Oil, Water, Chemical, Other.
For example, water, gas and any other utility using metering.
Pipeline Monitoring, Alert, and Control.

Embodiments of the present disclosure can also be used for non-industrial uses. Non-limiting examples of such uses include:

Home automation, monitoring, alerts, and control.
Automation, monitoring, alerts and control of systems for swimming pools, fountains, Jacuzzis, hot tubs, sprinklers and other water features including systems to control pumps, and measure water characteristics (e.g., temperature, pressure, pollution, flow rate, chlorination, pH, etc.).
Safety, security and monitoring systems including motion sensors, door/window contact sensors, glass break sensors, heat sensors, flood/water sensors, perimeter sensors, vibration sensors, microphones and cameras.

While embodiments of the disclosure are described with respect to respect to powering Radio Transceivers used to read water and gas meters, it should be understood that embodiments according to the present disclosure can be adapted to any of the types of applications described herein.

The present disclosure contemplates that the Radio Transceiver can be configured to implement any radio protocol. Non-limiting examples of radio protocols that can be used in embodiments according to the present disclosure include Cellular LTE (Long Term Evolution), LoRa (long range), and RF Mesh. Additionally, the present disclosure contemplates that, in some embodiments, the Radio Transceiver or radio protocol can be configured for one-way transmission or reception. In some embodiments according to the present disclosure, the Radio Transceiver can be replaced with a radio receiver that can only receive transmissions, and in some embodiments according to the present disclosure the Radio Transceiver can be replaced with a radio transmitter that can only transmit signals.

FIG. 1A illustrates a system block diagram of a device 100 suitable for implementing several embodiments of the disclosure. The device 100 includes a solar panel 102, a battery 104, an advanced power management circuit 106 and a capacitor, such as a supercapacitor 108 or the like. Non-limiting examples of capacitors that can be used include capacitors, hybrid layer capacitors ("HLC") and/or ultracapacitors. The advanced power management circuit 106 controls the flow of energy from the battery 104 and the solar panel 102 to the supercapacitor 108.

The advanced power management circuit 106 can draw power from the solar panel 102 or the battery 104 to charge the supercapacitor 108. If the solar panel 102 is generating electricity, then the advanced power management circuit 106 can charge the supercapacitor using the electrical energy produced by the solar panel 102. If the solar panel 102 is not generating electricity, then the advanced power management circuit 106 can charge the supercapacitor 108 using the battery 104. The advanced power management circuit 106 can decouple the supercapacitor 108 from the battery 104. Decoupling the supercapacitor 108 from the battery 104 can reduce the rate at which the battery 104 is discharged and increase the lifespan of the battery 104.

In some embodiments, the advanced power management circuit 106 can measure the voltage/current output by the solar panel 102 and/or battery 104, and determine whether to draw power from the solar panel 102 and/or battery 104 based on the measured voltage/current outputs. As a non-limiting example, if the voltage and/or current produced by the solar panel 102 is too low to charge the supercapacitor 108, then the advanced power management circuit 106 can charge the supercapacitor 108 using the battery 104 instead. Additionally, in some embodiments, the advanced power management circuit 106 can be configured to detect when the supercapacitor voltage is below a predetermined threshold and to only draw power from the battery 104 when the supercapacitor voltage is below that predetermined threshold.

In some embodiments according to the present disclosure, the advanced power management circuit 106 can include one or more computing devices (e.g., the computing device illustrated in FIG. 6) configured to control the flow of energy through the advanced power management circuit.

The supercapacitor 108 can be any type of capacitor, including capacitors that are not supercapacitors. Non-limiting examples of capacitors that can be used include capacitors, hybrid layer capacitors ("HLC") and/or ultracapacitors. Similarly, it should be understood that combinations or arrays of capacitors can be used to form the supercapacitor 108. The supercapacitor 108 can be operably connected to output power to the system power 110. A non-limiting example of a device that can be powered by the system power 110 is a radio transceiver (not shown).

The battery 104 can be any type of battery. Non-limiting examples of batteries 104 that can be used include long life batteries, including batteries with 10-20-year life spans. Long life batteries can include types of lithium polymer batteries.

In some embodiments, the advanced power management circuit 106 can measure the voltage and current flows from the battery 104 and/or the solar panel 102.

Figure 1B:
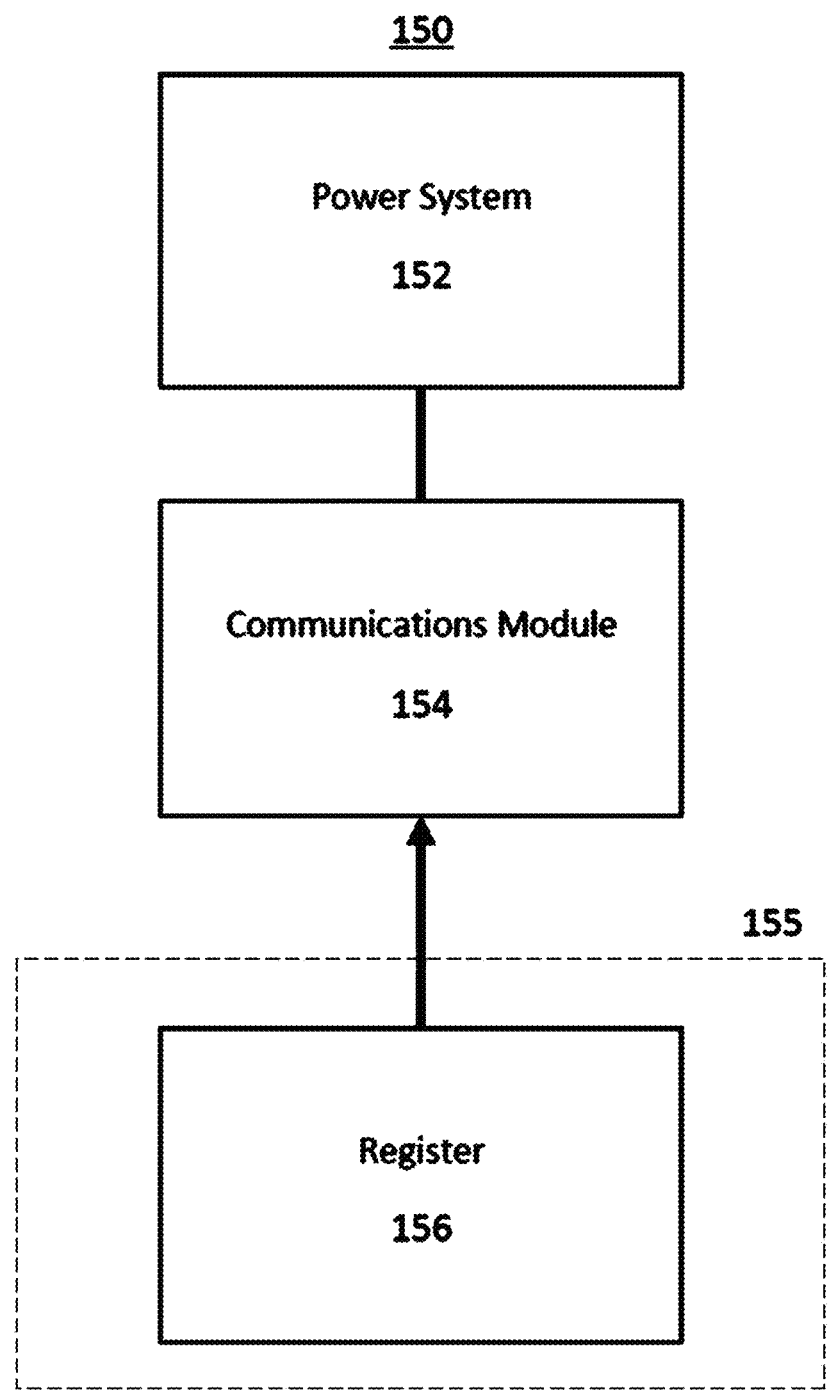

FIG. 1B illustrates a system block diagram of an example Radio Transceiver 150 suitable for implementing several embodiments of the disclosure. The Radio Transceiver 150 includes a power system 152 (which can correspond to the device 100 illustrated in FIG. 1A). The power system 152 can be operably connected to the communications module 154. It should be understood that the components illustrated in FIG. 1B can be implemented as part of separate devices (e.g. on separate printed circuit boards or in separate assemblies) or that, in some implementations, the components illustrated in FIG. 1B can be implemented in combination (e.g., as part of a self-contained device). As a non-limiting example, the register 156 can be part of the same assembly or printed circuit board as part of the power system 152, and, again as a non-limiting example, the solar panel illustrated in FIG. 1A can be part of the same assembly as the register 156.

Moreover, in another non-limiting example embodiment, the communications module 154 and the power system 152 can be part of the same device or assembly. In some implementations according to the present disclosure, the communications module 154 and power system 152 are packaged in a single assembly, and the single assembly can be used with different types of registers 156 (e.g., different models of register, or registers for different types of utilities/commodities). In some embodiments according to the present disclosure, the register 156 is part of a utility meter 155. Additionally, it should be understood that the utility meter 155 and/or register 156 can be configured to measure any type of commodity and/or utility service.

The communications module 154 can transmit information from the register and/or power system through a network. Non-limiting examples of networks include: ethernet, Wi-Fi, Bluetooth, Bluetooth low energy (BLE), cellular data networks (e.g., Long Term Evolution, referred to as LTE), and radio networks. In some implementations according to the present disclosure, the communications module 154 can implement one or more network topologies. Non-limiting examples of network topologies include star networks, and mesh networks.

The communications module 154 can also be configured to receive information from the network. The information can include control signals, which the communication module can transmit to other components of the system (e.g., the register 156). In some embodiments according to the present disclosure, the communication module 154 is can be configured to send a signal to a control device (e.g. a relay) (not shown) that is part of the system. As a non-limiting example, the control device can open or close a valve or breaker to control the flow of utilities through the meter or control a valve or other component of the system.

Additionally, in some implementations according to the present disclosure, the power system 152 can be controlled by a controller (not shown) or by the communications module 154. The controller or communications module 154 can include a computing device (e.g. the computing device 600 illustrated in FIG. 6) which can transmit signals to the power system 152 and cause the power system 152 to change the voltage/current that is input/output by any component of the power system 152.

Figure 1C:
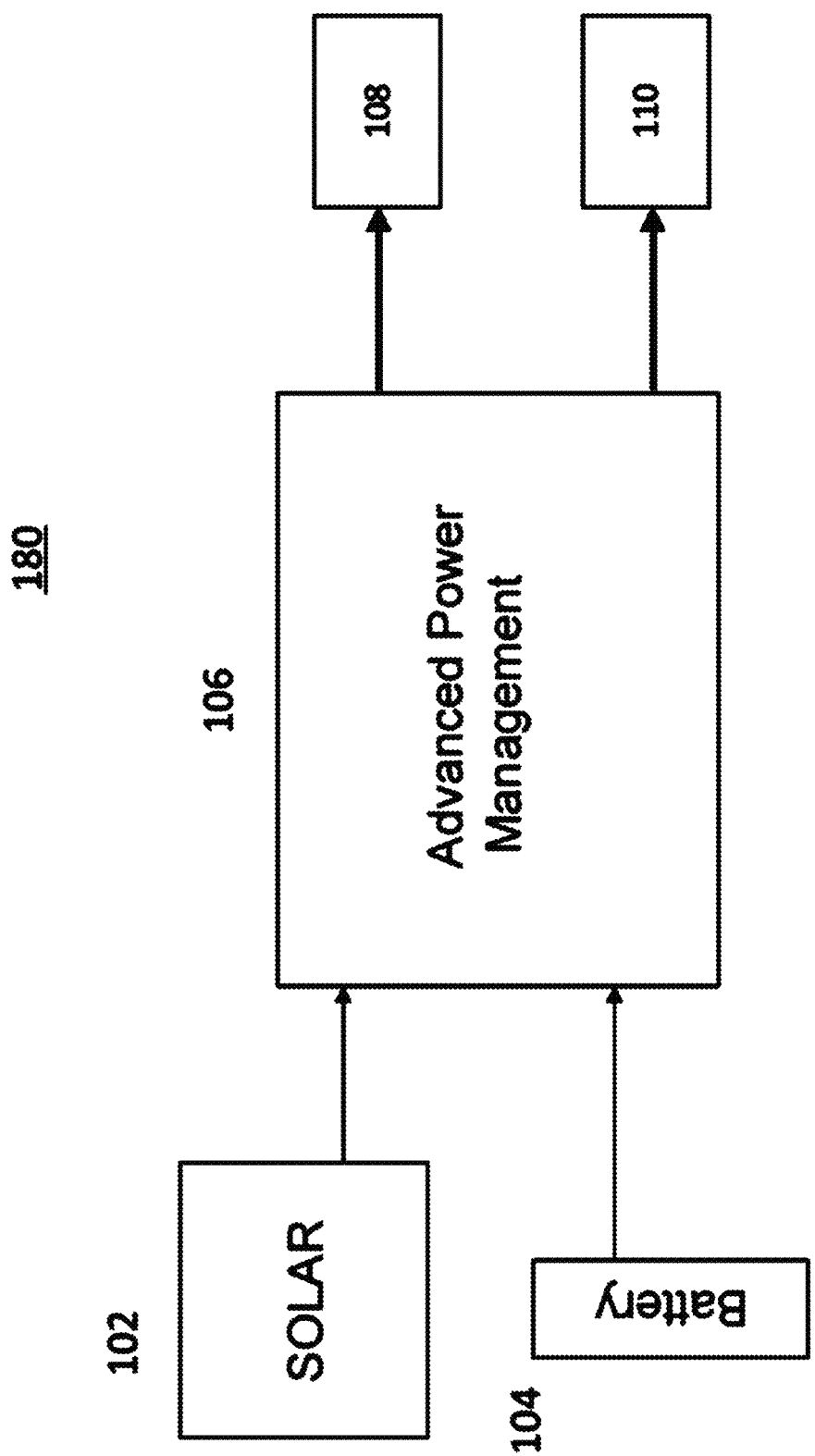

With reference to FIG. 1C, a device 180 is shown that is suitable for implementing some embodiments according to the present disclosure. In FIG. 1C, the device 180 can include the same configuration of solar panel 102 battery 104 and advanced power management circuit 106 illustrated in FIG. 1A. In the device shown in FIG. 1C, the advanced power management circuit 106 is configured to separately power the supercapacitor 108 and the system power 110. Optionally, the advanced power management circuit 106 can be configured to charge and discharge the supercapacitor 108 to supply power to the system power 110.

Figure 2A:
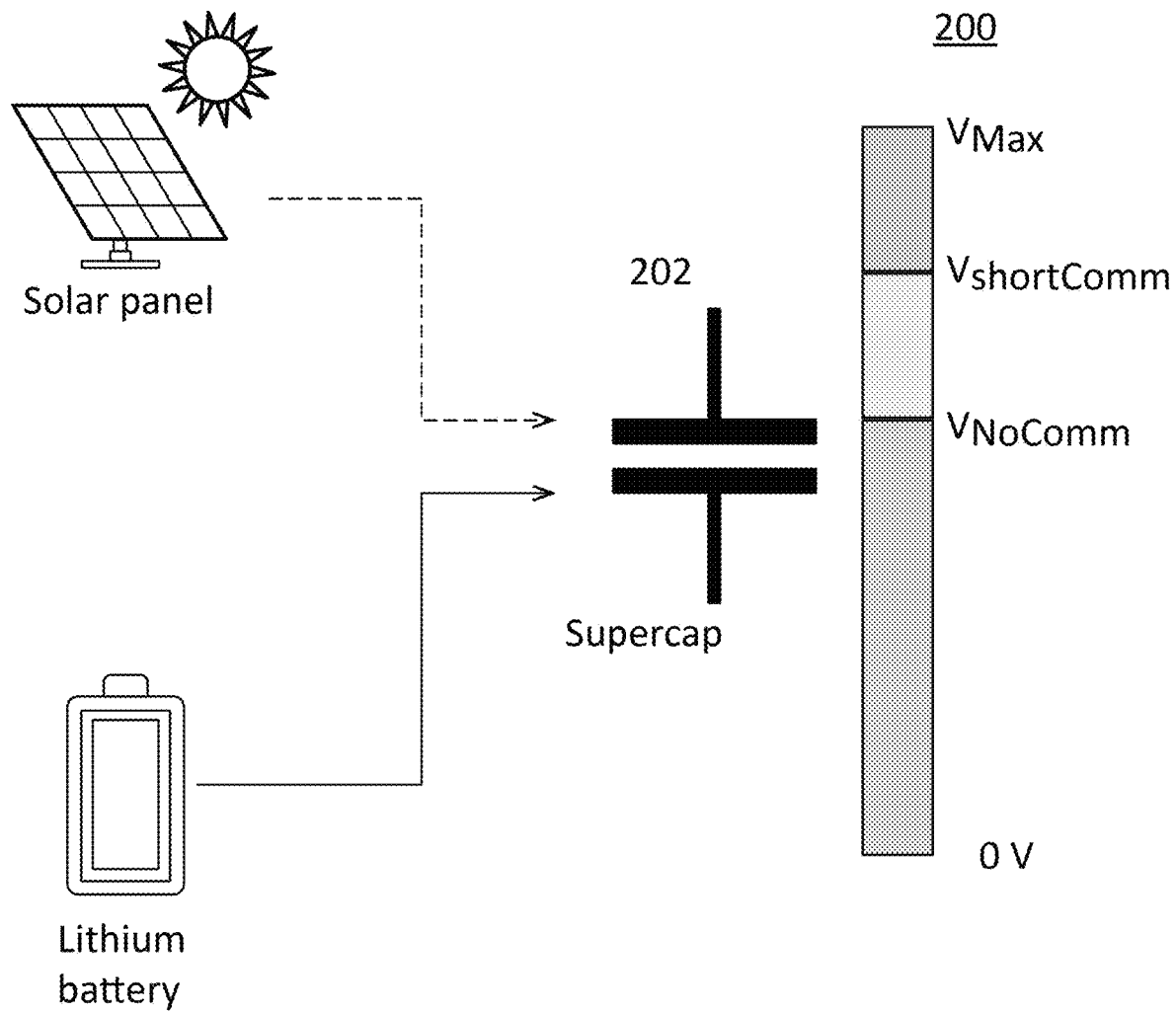
FIGS. 2A-2B illustrate method for controlling a power system, according to several embodiments of the disclosure.

The present disclosure also includes methods for controlling the advanced power management circuit, e.g., the advanced power management circuit 106 illustrated in FIG. 1A. As shown in FIG. 2A, the method of charging can be based on one or more threshold values 200. In some embodiments according to the present disclosure, the advanced power management circuit (shown as 106 in FIG. 1A) can charge the supercapacitor (e.g. the supercapacitor 202 illustrated in FIG. 2A) based on the rules illustrated in FIG. 2A.

If the voltage on the supercapacitor in the Radio Transceiver is below $V_{NoComm}$ the supercapacitor can be charged from the lithium battery until the voltage reaches $V_{ShortComm}$ If the voltage on the supercapacitor in the Radio Transceiver is below $V_{Max}$ the supercapacitor can be charged from the solar panel (if possible) until the voltage reaches $V_{Max}$ Additionally, it should be understood that the supercapacitor can be charged from both the battery and solar panel at the same time.

Figure 2B:
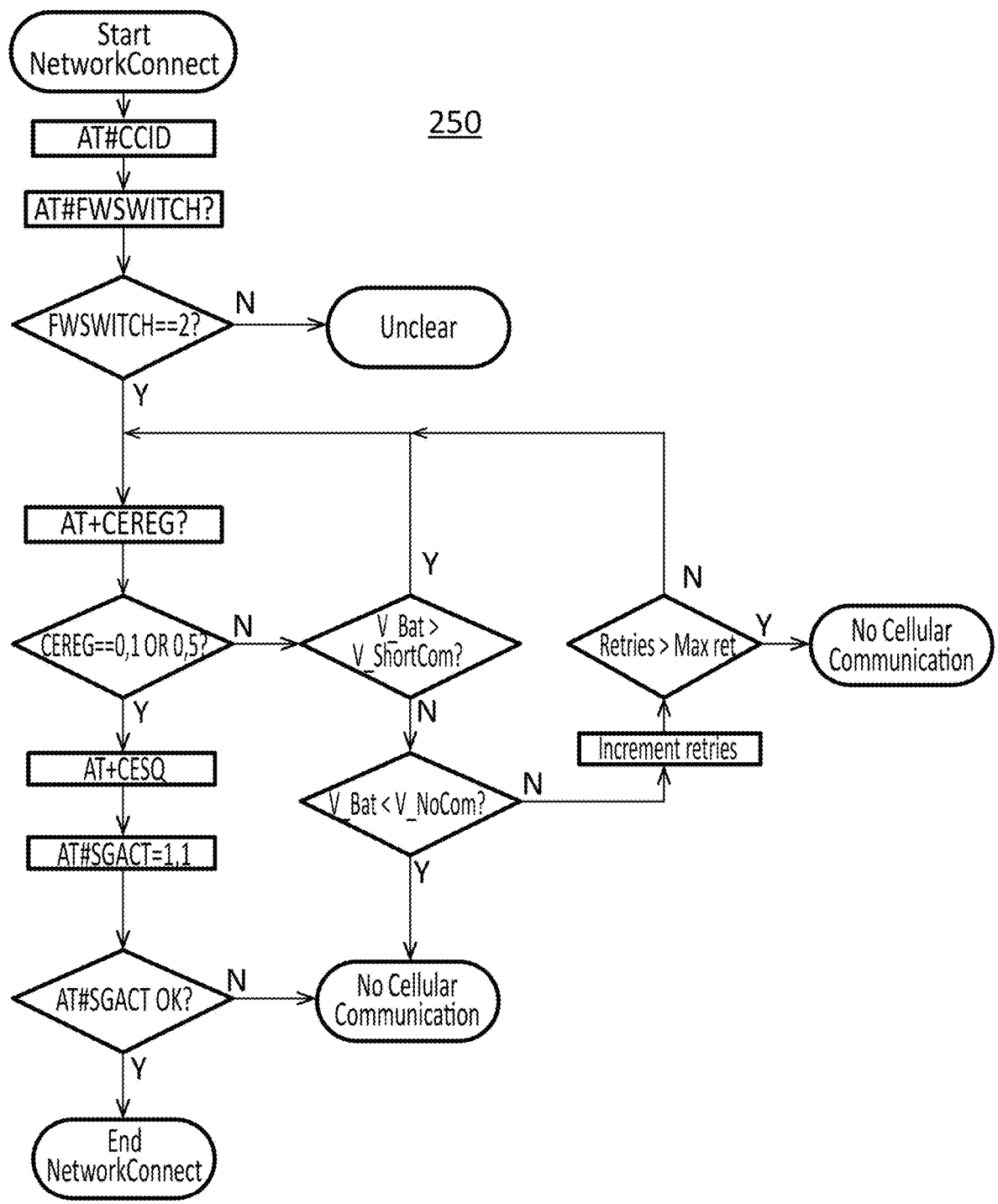

With reference to FIG. 2B, a non-limiting example of a method of controlling the system illustrated in FIGS. 1A and 1B is illustrated. The method 250 can include starting and stopping network connections, measuring the battery voltage, and comparing the battery voltage to predetermined threshold values (e.g., the values illustrated in FIG. 2A). The method 250 can also include sending signals to the communications module (e.g., the communications module 154 illustrated in FIG. 1B). The signals to the communications module can cause the communications module to initiate or terminate network connections.

Figure 3B:
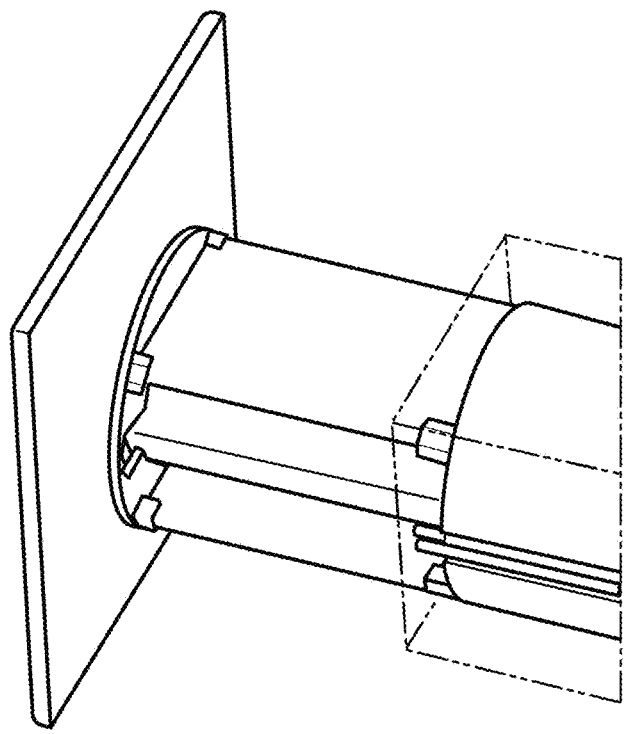
Figure 3A:
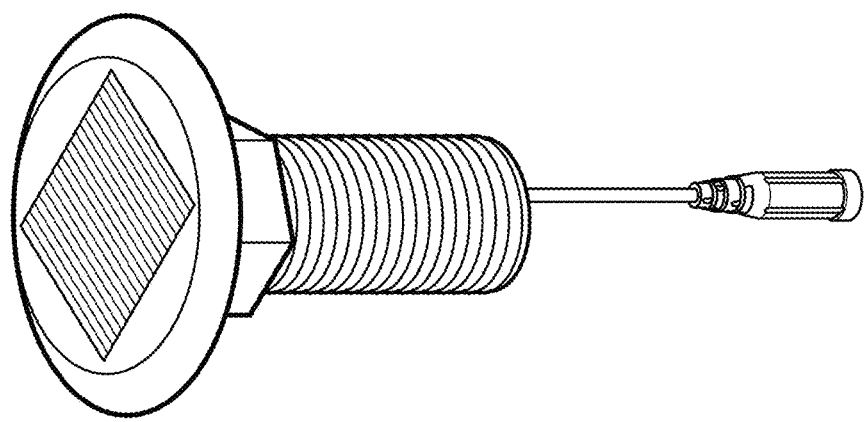

FIGS. 3A-3H illustrate Radio Transceivers suitable for implementing several embodiments of the disclosure. FIG. 3A illustrates a perspective view of a Radio Transceiver with a solar panel according to an example embodiment according to the present disclosure.

Figure 3C:
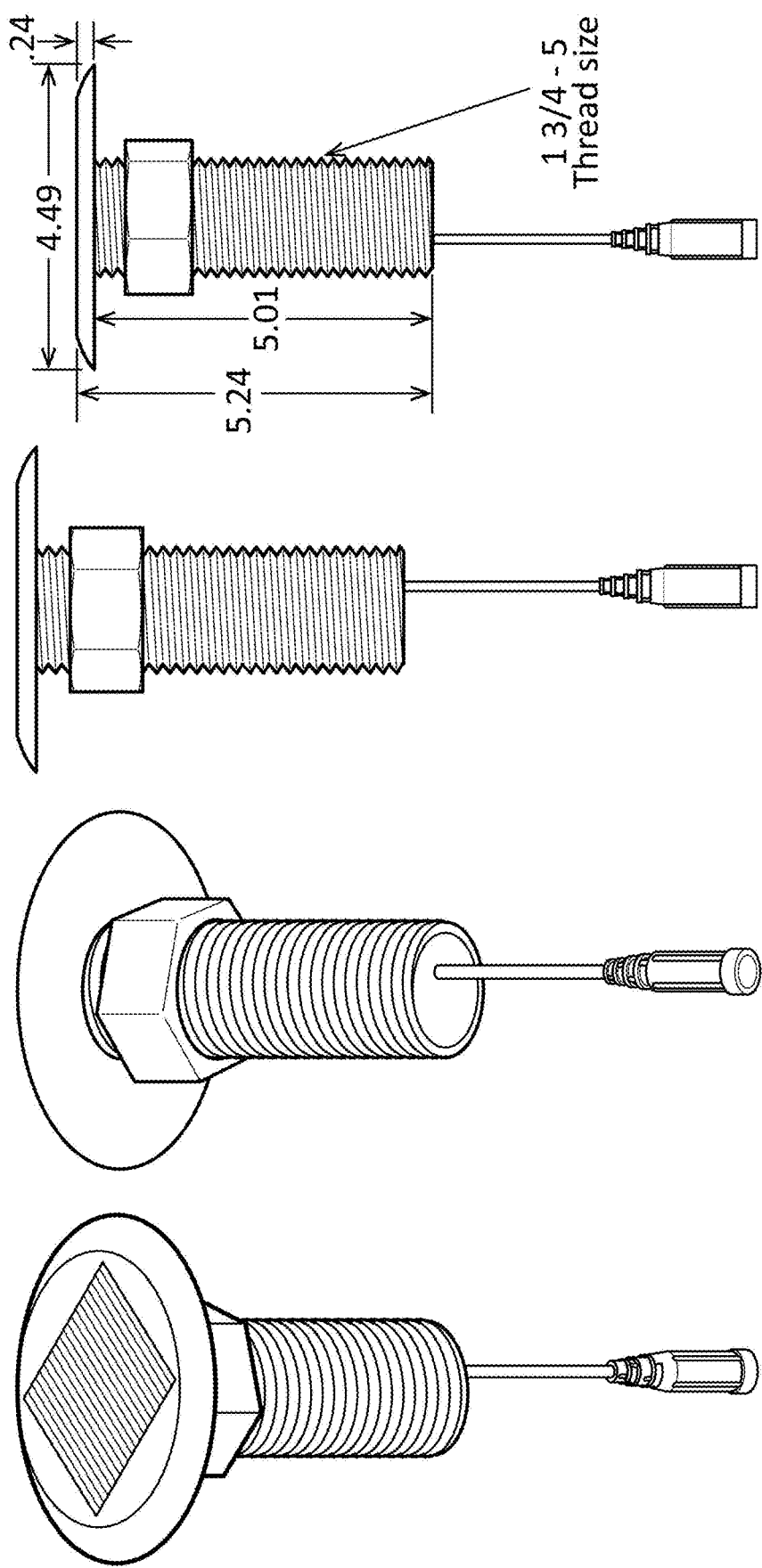
Figure 3D:
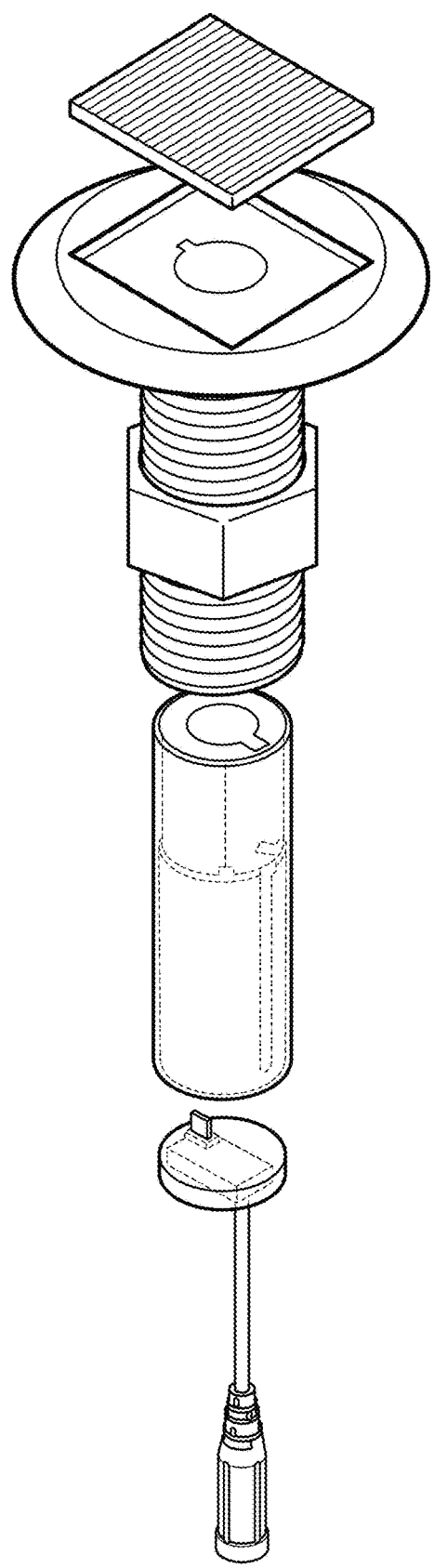
Figure 3E:
Figure 3E:
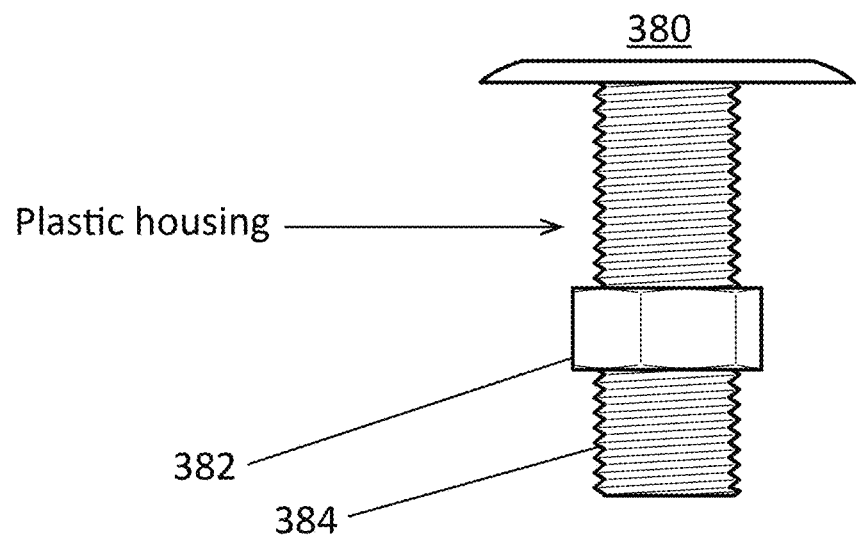
Figure 3E:
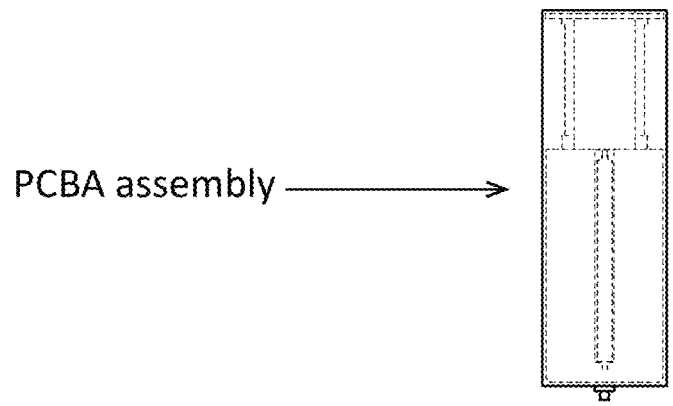
Figure 3E:
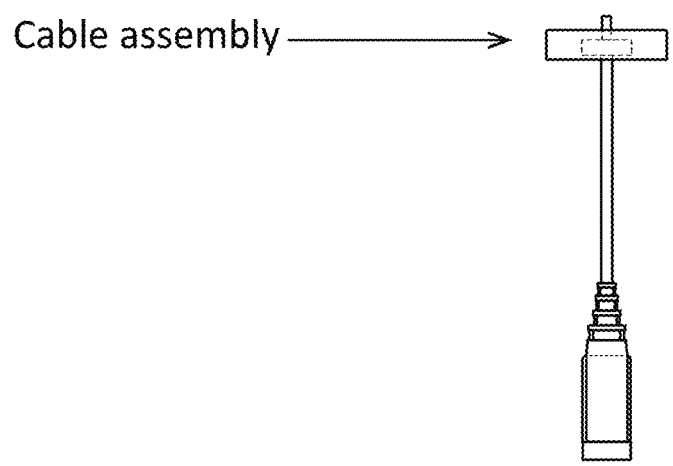

FIG. 3B illustrates a cutaway perspective view of a Radio Transceiver, according to an example embodiment according to the present disclosure. FIG. 3C illustrates perspective views of a Radio Transceiver according to yet another an example embodiment according to the present disclosure. FIG. 3D illustrates a perspective exploded view of a Radio Transceiver according to an example embodiment according to the present disclosure; FIG. 3E illustrates a side view of a Radio Transceiver according to an example embodiment according to the present disclosure. In some embodiments a plastic housing 380 can include a nut 382 adapted to threads 384 formed on the plastic housing. The nut 382 can be attached and removed from the threads. For example, the nut 382 can be removed from the threads, and the plastic housing 380 can be placed through an opening (e.g. an opening formed in lid or cover) (not shown). Once the plastic housing 380 is positioned in the opening, the nut 382 can be screwed onto the threads 384 to attach the plastic housing 380 to the opening. Optionally, in some embodiments, an ultrasonic process (e.g. ultrasonic welding) can be used to attach the plastic housing 380 to the opening.

In some embodiments according to the present disclosure, a non-limiting example of the Radio Transceiver can include sensors for water intrusion detection. The water intrusion detection sensor can be configured to transmit a signal either by a wired or wireless connection indicating when water intrusion has been detected. The power system 152 and/or communication modules 154 illustrated in FIG. 1B can include a computing device (e.g. the computing device illustrated in FIG. 6) and can be configured to receive the signal from the water intrusion detection sensor indicating that water intrusion has been detected. In turn, in some embodiments according to the present disclosure, the communications module 154 can transmit a signal indicating that water intrusion has been detected.

A non-limiting example of a water intrusion sensor is a microchannel water intrusion sensor. For example, with reference to FIG. 3E, the plastic housing 380 of a Radio Transceiver 300 can include a microchannel formed on the side of the package configured to detect water intrusion into the plastic housing 380.

Figure 3F:
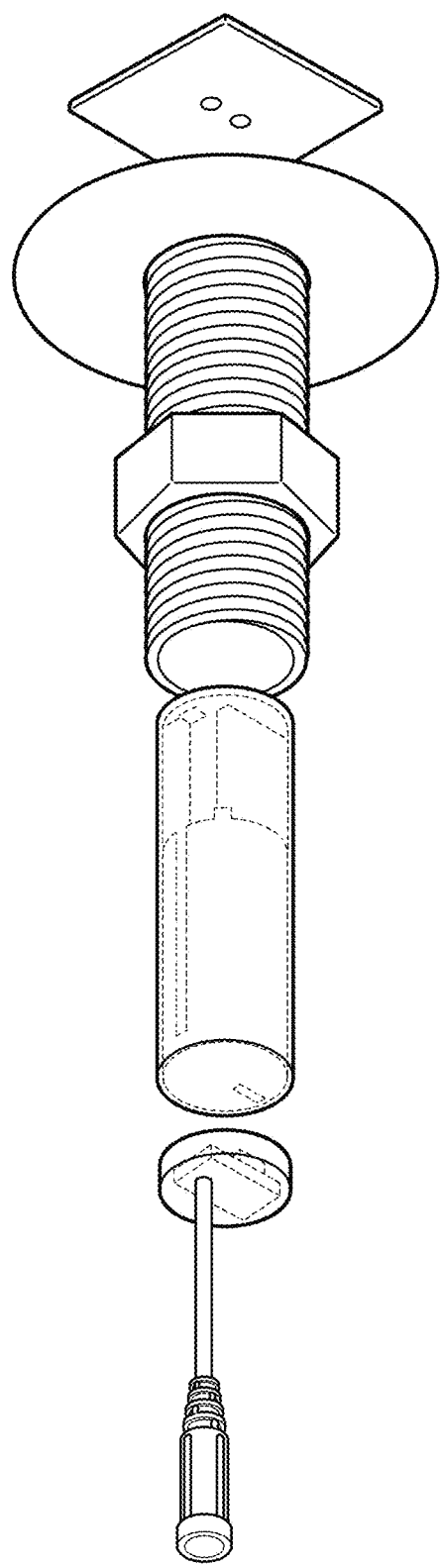

FIG. 3F illustrates an exploded perspective view of a Radio Transceiver according to an example embodiment according to the present disclosure. FIG. 3G illustrates a perspective view of a connection between a PCBA and cable assembly. FIG. 3H illustrates a perspective view of a connection between a PCBA and a cable assembly.

Figure 4A:
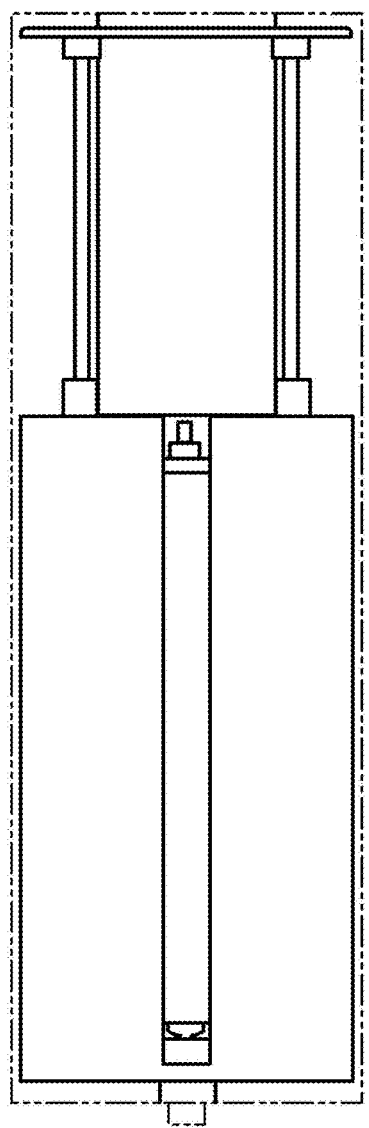
FIGS. 4A-4E illustrate printed circuit board assemblies suitable for implementing several embodiments of the disclosure.
Figure 4B:
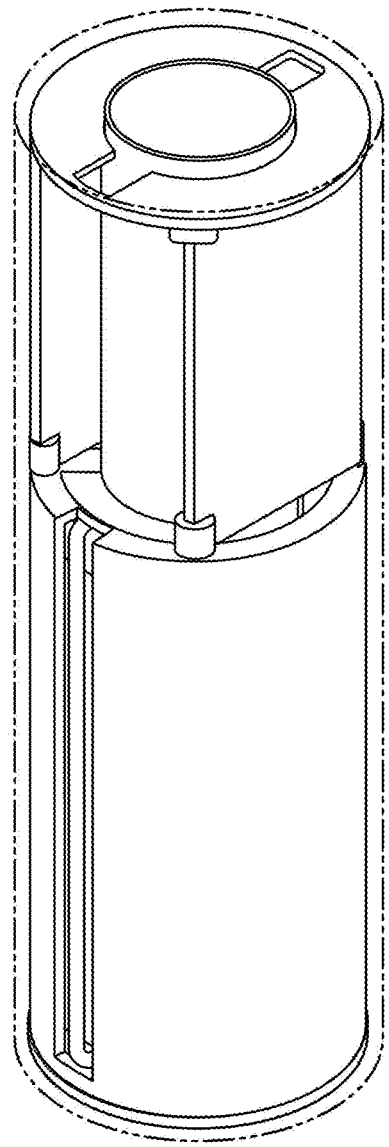
Figure 4C:
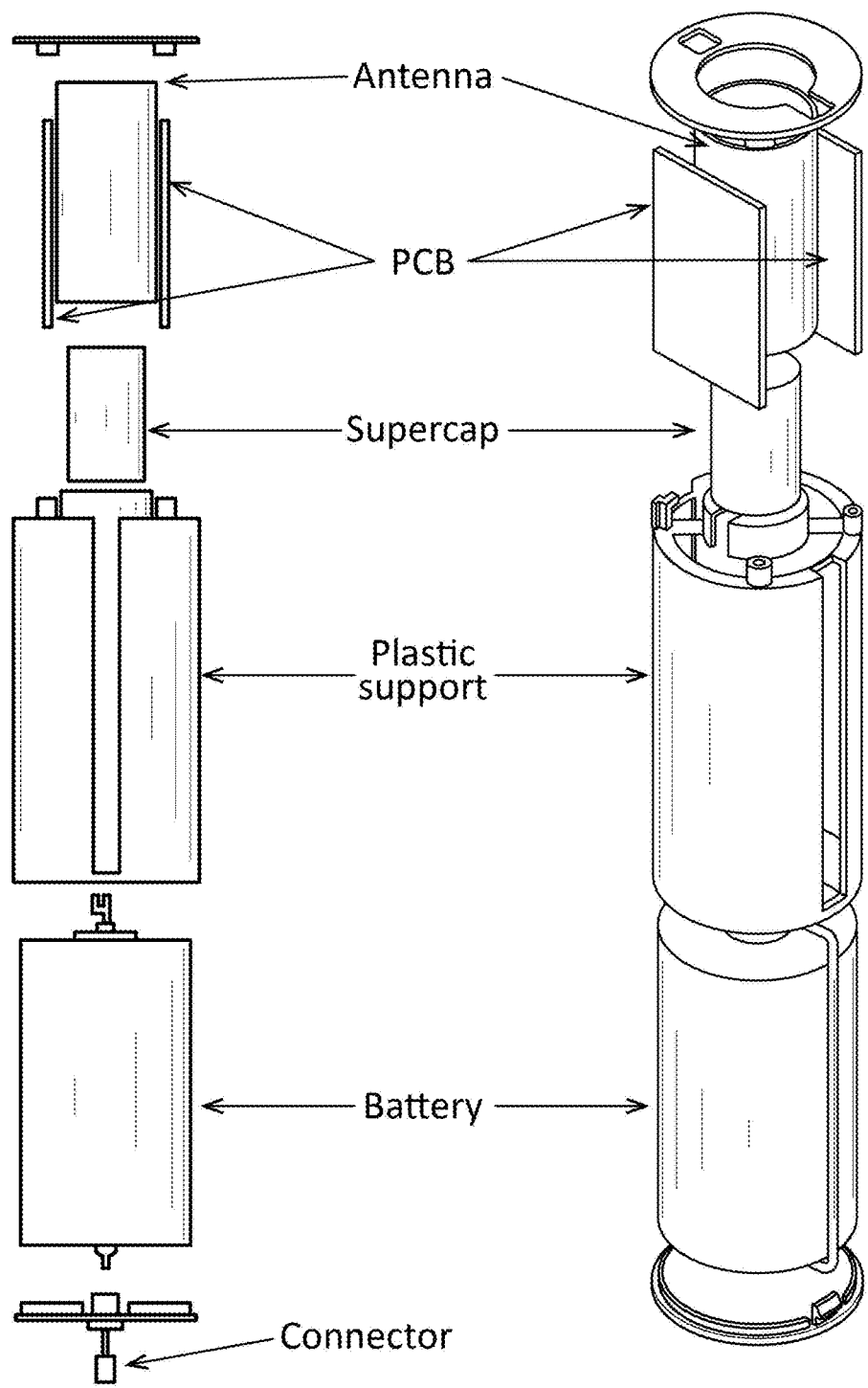
Figures 4D, 4E:
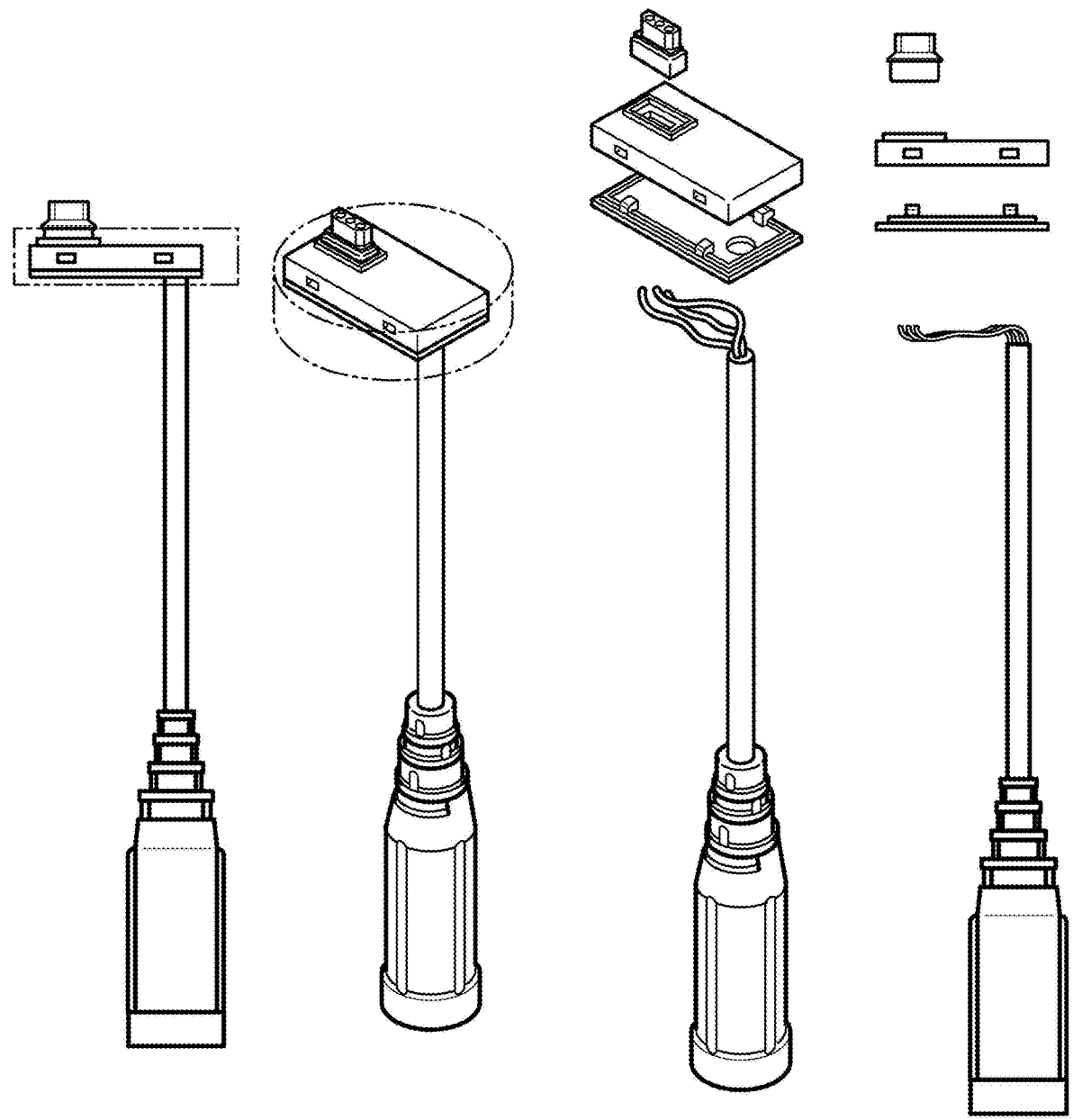

FIGS. 4A-4E illustrate printed circuit board assemblies suitable for implementing several embodiments of the disclosure. FIG. 4A is a side view of a printed circuit board assembly including overmolding. FIG. 4B is a perspective view of a PCB assembly including overmolding. FIG. 4C illustrates an exploded view of a printed circuit board assembly including overmolding. FIG. 4D illustrates cable assemblies. FIG. 4E illustrates an exploded view of cable assemblies.

Figure 5A:
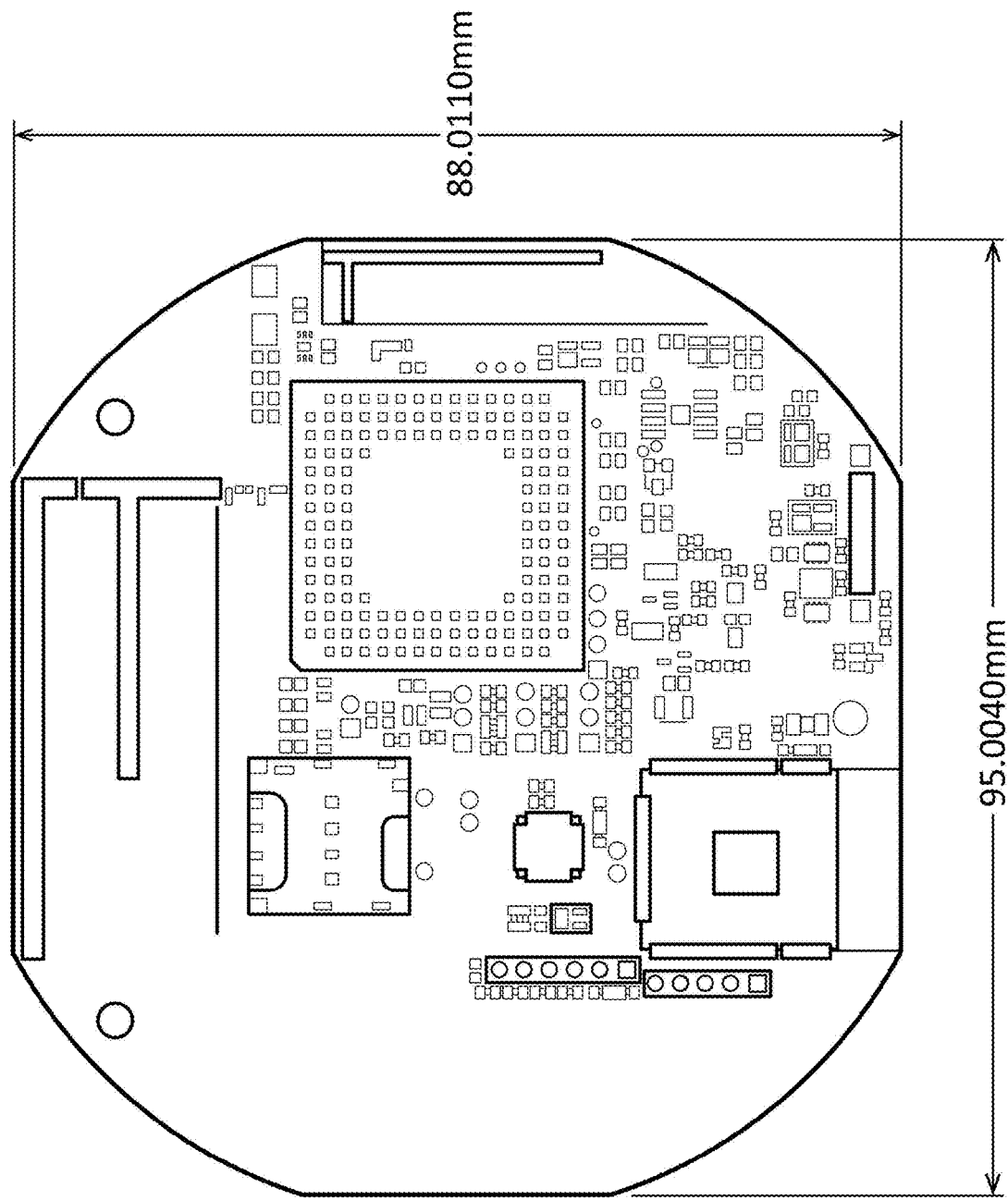
FIGS. 5A-5C illustrate printed circuit boards suitable for implementing several embodiments of the present disclosure.
Figure 5C:
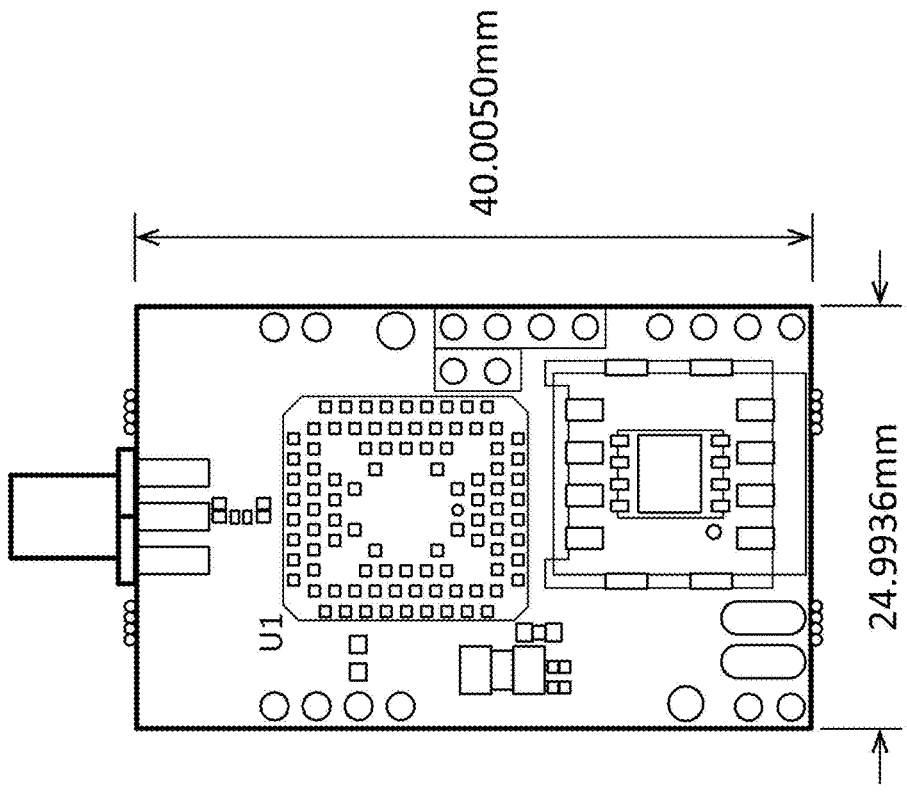
Figure 5B:
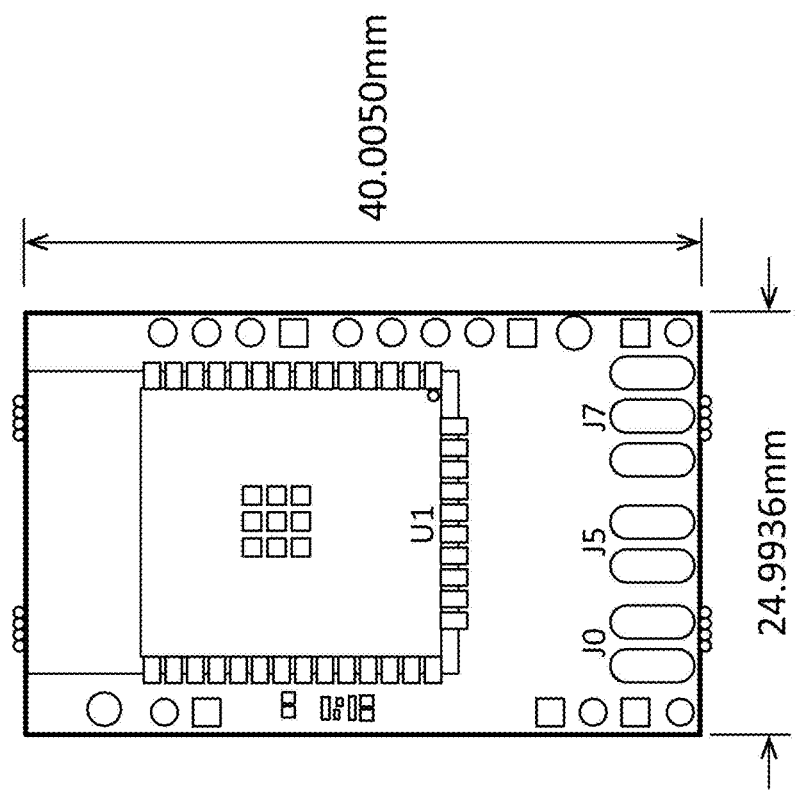

FIGS. 5A-5C illustrate printed circuit boards suitable for implementing several embodiments according to the present disclosure. FIG. 5A illustrates a schematic of a printed circuit board, FIG. 5B illustrates a top view of a schematic of another printed circuit board. FIG. 5C illustrates a bottom view of the printed circuit board illustrated in FIG. 5B.

EXAMPLE EMBODIMENTS

With reference to FIGS. 7A-7H, non-limiting example embodiments are shown. The example embodiments can be configured to achieve 20 or more years of operation in harsh environmental conditions. Additionally, the example embodiments can include the ability to sense and report across LTE Network to Head End Systems and Users. Non-limiting examples of information that can be sensed and reported include: battery life, water intrusion, and temperature measurements.

Figure 7A:
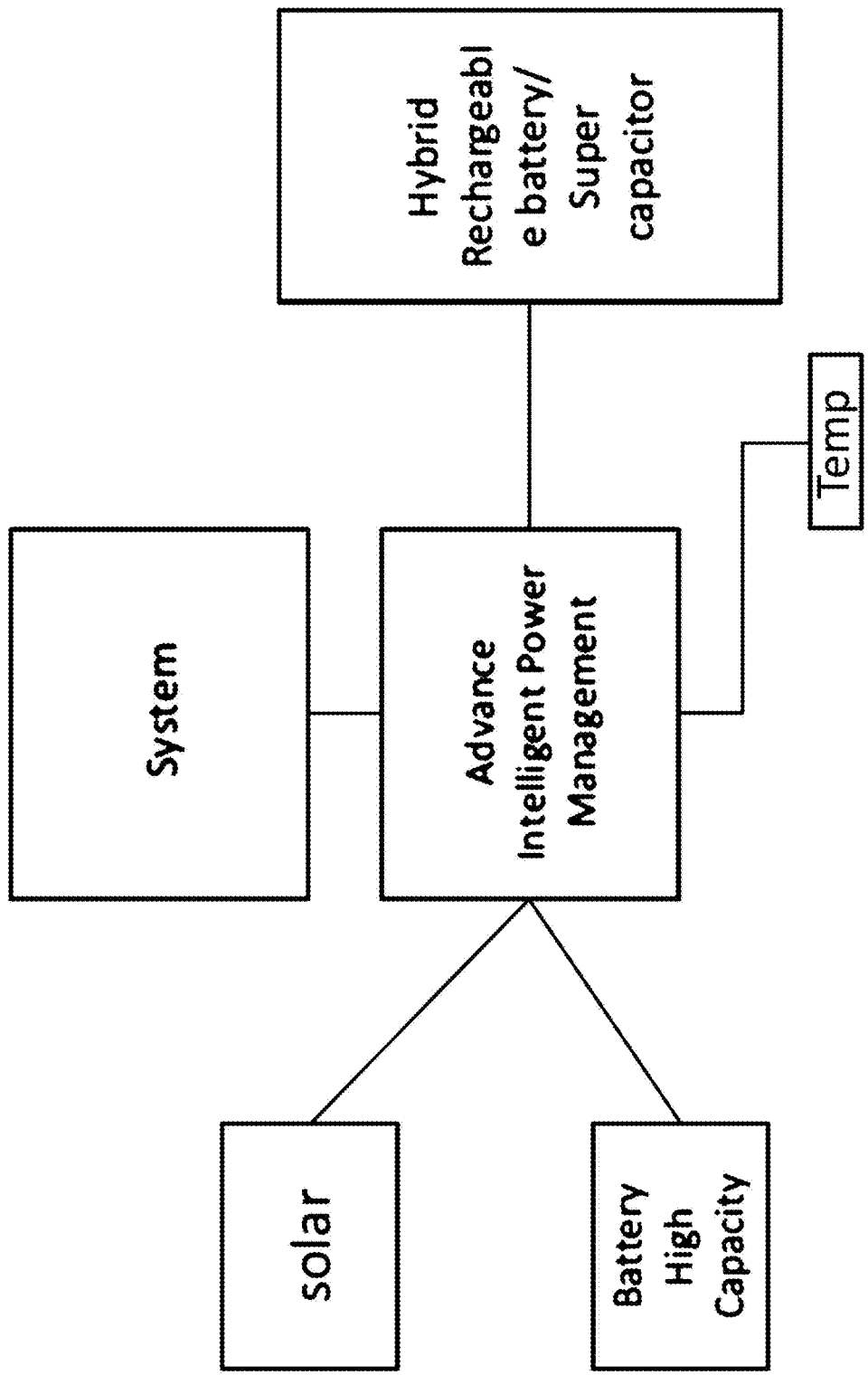
FIG. 7A-7H illustrate example embodiments according to the present disclosure.

With reference to FIG. 7A, a block diagram of an example embodiment is shown. The example embodiment includes a main processor PCBA, communication PCBA, long-life battery, hybrid rechargeable battery, and solar panel. While the example embodiments shown in FIG. 7A-7H include a hybrid rechargeable battery, it should be understood that supercapacitors and other energy storage devices can be used, as described throughout the present disclosure.

The example embodiments can include a specialized intelligent power supply designed to support long-life operation. The advanced power supply can control the flow of energy to and from the hybrid rechargeable battery and/or super capacitor, and the advanced power supply can monitor the charge status of the hybrid rechargeable battery and/or supercapacitor. Additionally, the advanced power supply can quickly determine from which source to charge the hybrid rechargeable battery and/or supercapacitor based on temperature and/or solar charge capability. Also, conditions of over charge and under charge can be monitored and calibrated based on the current environmental temperature conditions.

As a non-limiting example, if the hybrid rechargeable battery voltage is less than 3.42 volts, the advanced power supply can check the temperature of the hybrid rechargeable battery, check the voltage from the solar panel(s) and check the voltage of the hybrid rechargeable battery. If the solar voltage is sufficient, the advanced power supply can charge the hybrid rechargeable battery to 4.52V. The rate of charging, or whether to charge the rechargeable battery at all, can be controlled based on the temperature of the battery and/or the temperature of any other system components.

Figure 7B:
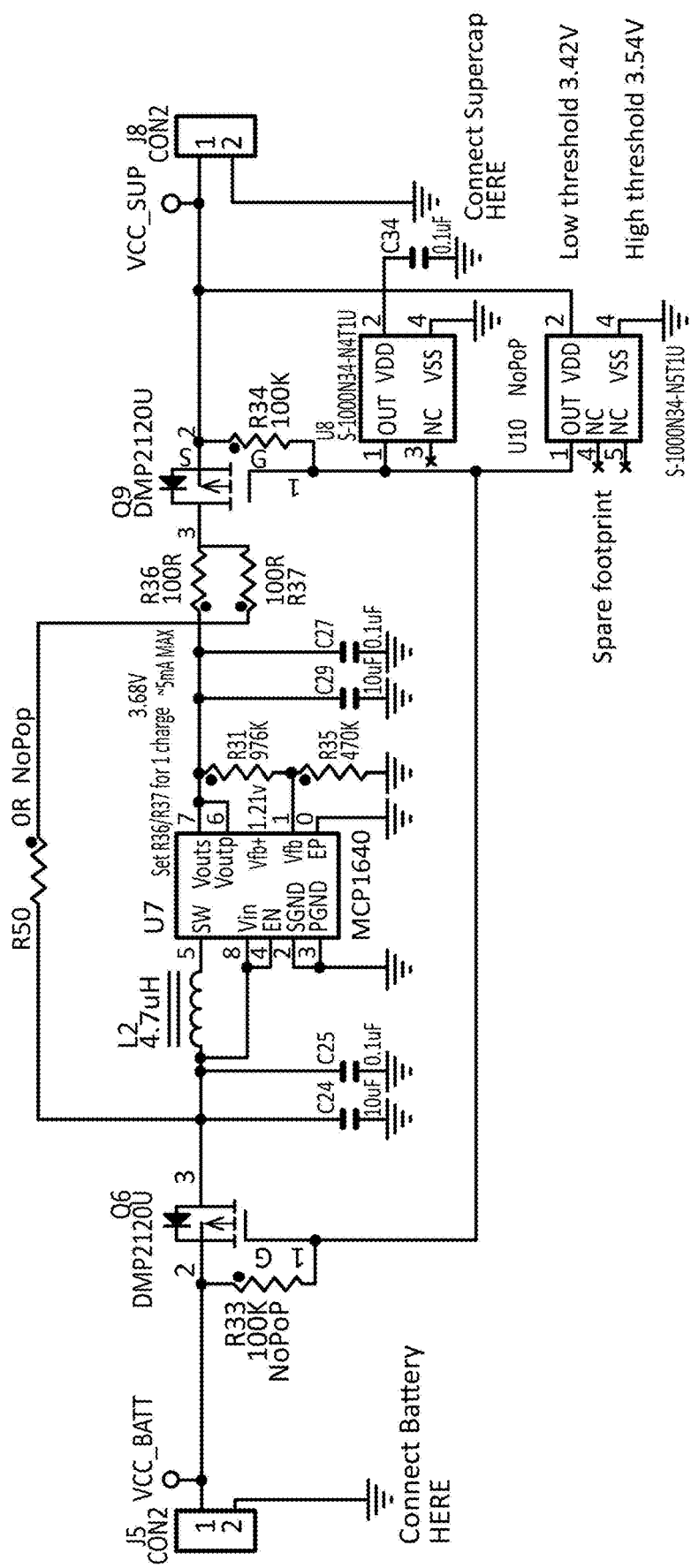
Figure 7C:
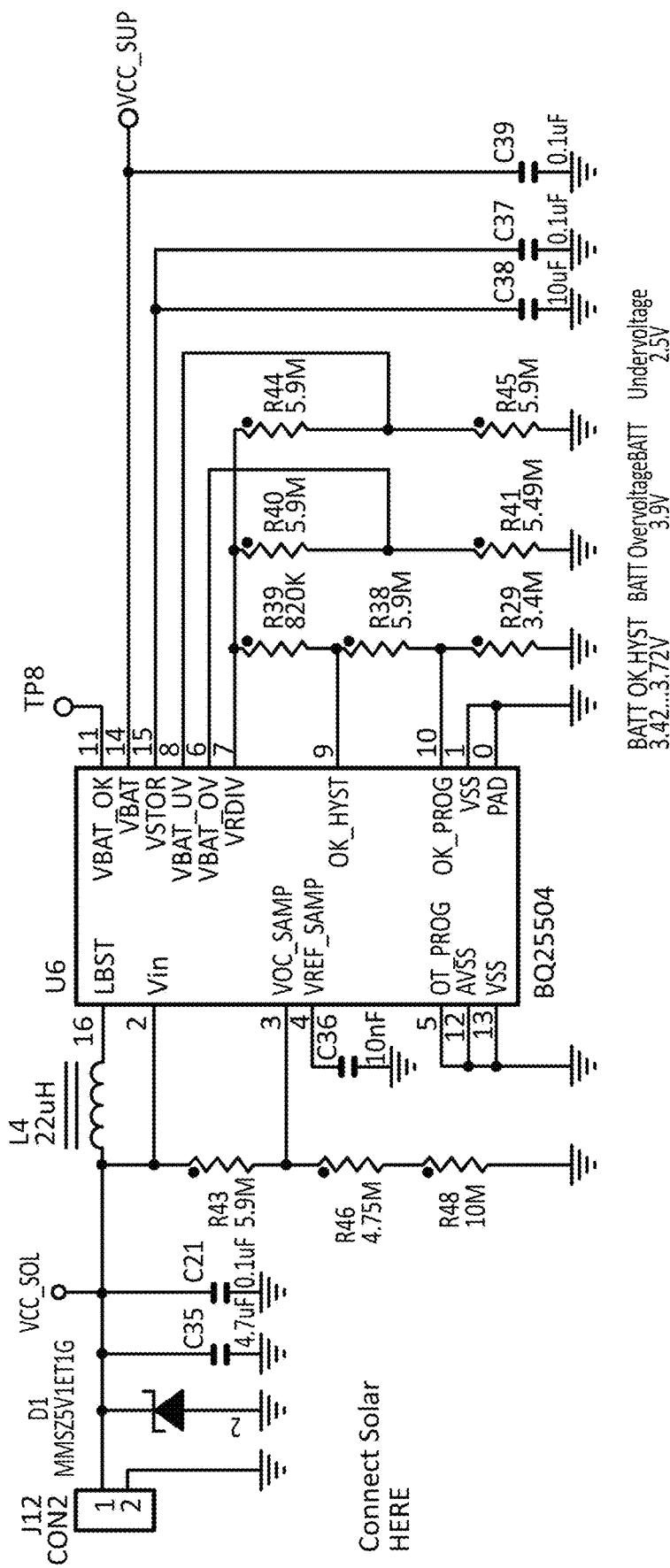

The present disclosure contemplates that the system block diagram shown in FIG. 7A can be implemented using any combination of electronic components. FIG. 7B illustrates a non-limiting example schematic for a circuit connected to the solar panel, and FIG. 7C illustrates a non-limiting example schematic for a circuit connected between the long-life battery and the hybrid rechargeable battery that are illustrated in FIG. 7A.

Figure 7D:
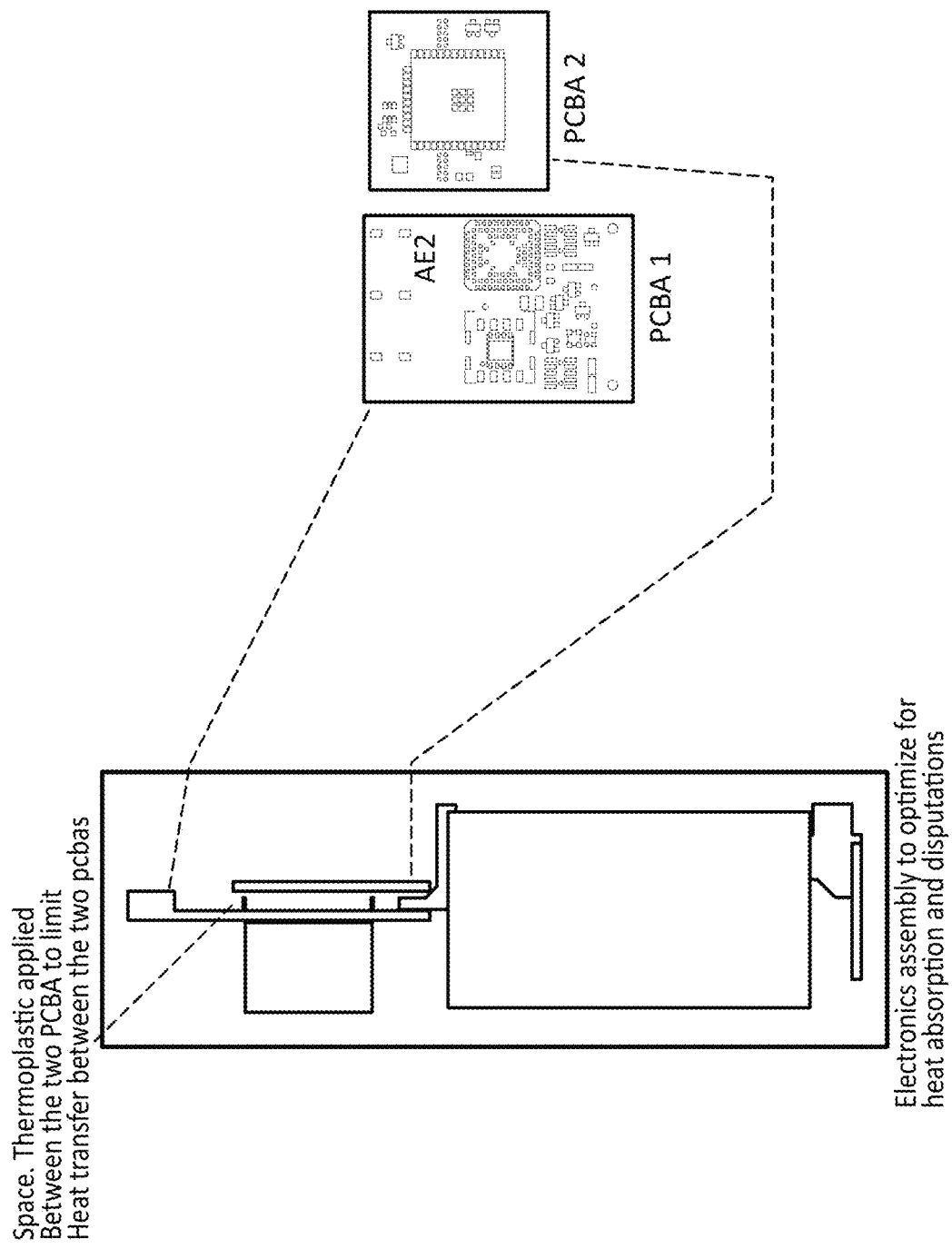

The block diagram illustrated in FIG. 7A can be implemented using any number of circuit boards. As shown in FIG. 7D, in some embodiments according to the present disclosure the circuits can be implemented using two circuit boards. The circuit boards can be spaced within a housing, and thermoplastic can be applied between the two circuit boards to limit the heat transfer between the two circuit boards.

The example embodiment can include features for detecting/mitigating water and/or vapor intrusion. A standard that can be met by the example embodiments is the IP68 waterproofing standard.

To restrict the amount of heat generated by the main system board, and also to limit the high heat transfer from direct sun exposure, the system board can be separated into two PCBA boards, and heat-generated components separated to be able to achieve the minimum average temperature.

As shown in FIG. 7D, in some embodiments according to the present disclosure, the external enclosure can be formed with one cavity to limit the points of failure to water ingression.

Figure 7E:
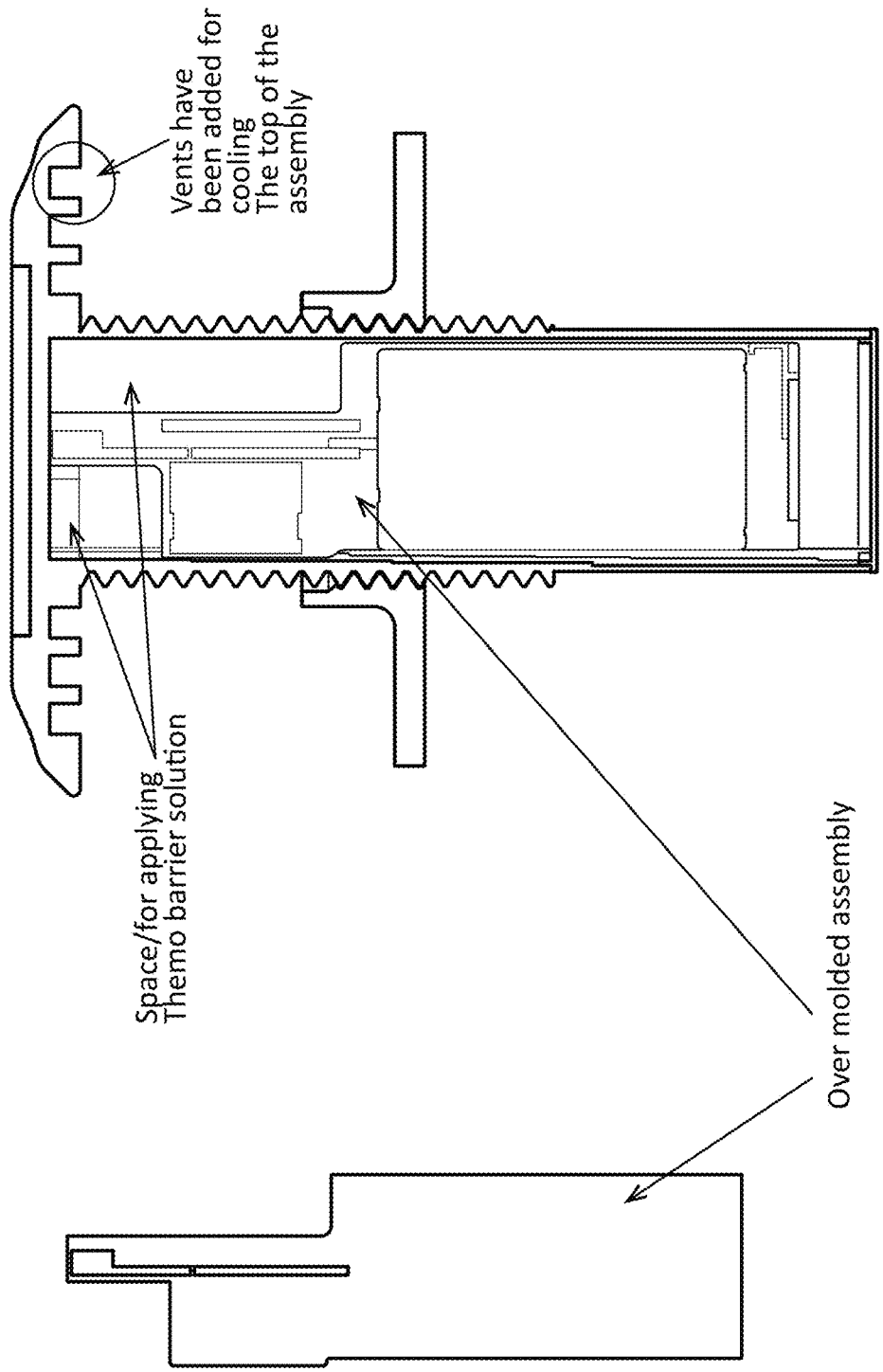

With reference to FIG. 7E, embodiments according to the present disclosure can use over-mold injection technologies to encapsulate part or all of the system so that the system can be protected from intrusion without conformal coating or potting. Over-mold technology can allow high precision injection of thermoplastic polyamide for encapsulating the electronic circuits, battery and super capacitor in one module. Thus, the system can be protected against moisture, chemical exposure, high temperature, and/or aggressive temperature cycles. The two PCBAs can be sandwiched, and the design can be configured so that the thermoplastic is present between the two PCBAs to create thermic isolation between the two circuit boards. It should be understood that any number of PCBAs can be layered and separated by any number of layers of thermoplastic. For example, in embodiments with three circuit boards, the three circuit boards can be separated by two layers of thermoplastic, where the first layer of thermoplastic is between the first and second circuit boards, and the second layer of thermoplastic is between the second and third circuit boards.

During the assembly process, a close cell foam can be applied before module insertion in the enclosure to provide an additional thermal barrier against heat transfer (e.g., heat caused by direct sunlight).

Figure 7F:
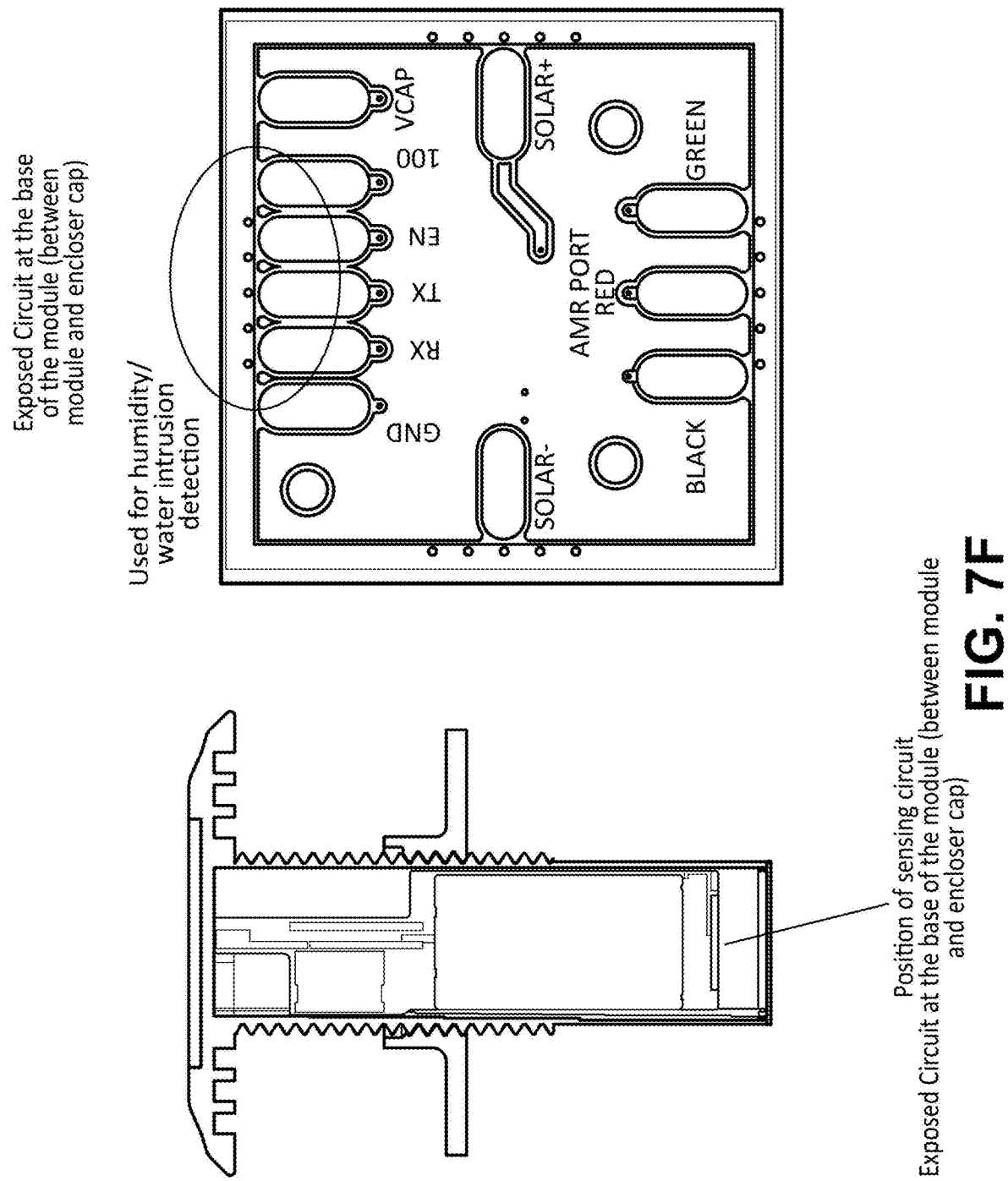

With reference to FIG. 7F, embodiments according to the present disclosure can include a PCB configured to detect water and/or moisture. Micro channels and/or micro spaces between enclosure and modules (e.g., the PCBs) are designed to move humidity and water to the bottom of the module, where the sensor may be placed to detect the level of humidity present in the enclosure.

Additionally, embodiments according to the present disclosure can determine when to stop charging or to stop communicating based on the temperatures sensed at the one or more temperature sensors. For example, communication and charging can be limited or disabled if a high temperature threshold is exceeded. The temperature sensors can be operably connected to the advanced power supply described with reference to FIG. 7A, and the advanced power supply can control the charging and communications based on the one or more temperature measurements.

Additionally, embodiments according to the present disclosure can predict the future lifespan of the system. For example, a computing device that is part of the system (e.g., a computing device that is part of the advanced power supply) can record temperature, battery usage, and water intrusion detections, and analyze and predict the recorded information to output a predicted future lifespan for the system.

Figure 7G:
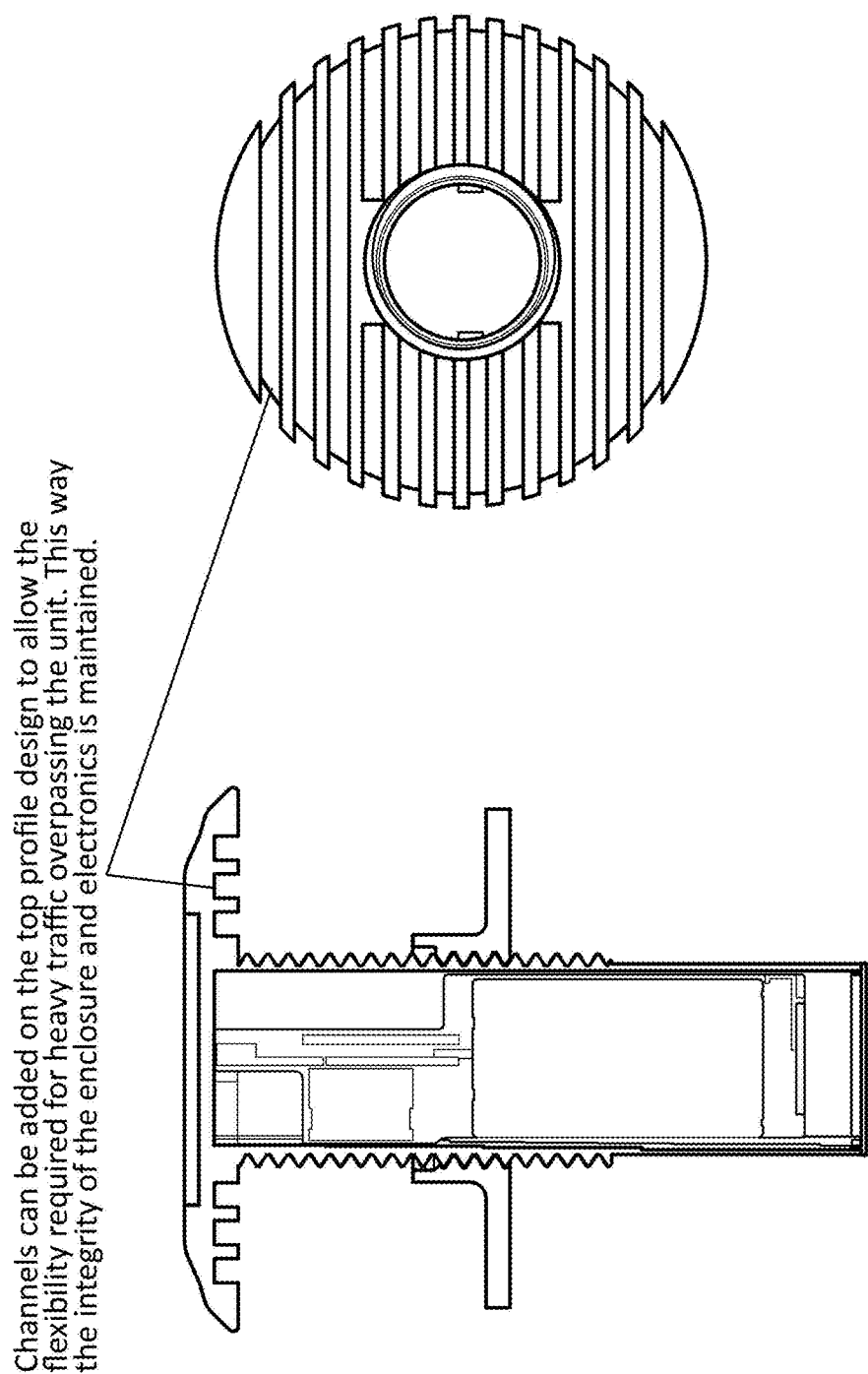

Embodiments according to the present disclosure can be configured for use in locations where the device is subject to crushing forces (e.g., in road surfaces). As shown in FIG. 7G, the device can include channels on the top profile of the design. The channels can allow the top profile to flex when a load is applied to the surface of the device.

Figure 7H:
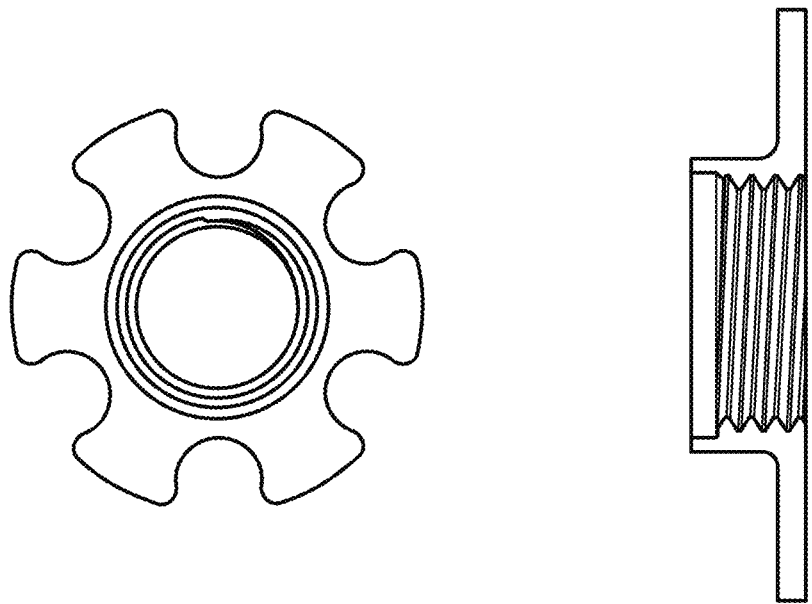
Figure 7H:
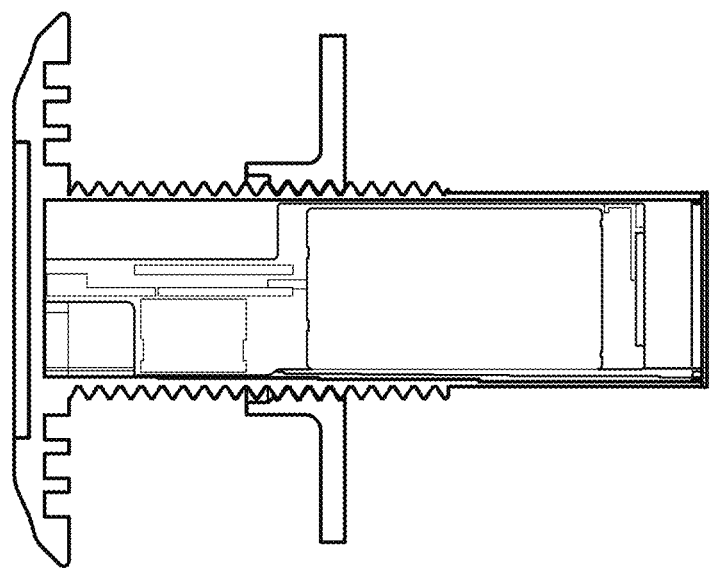

With reference to FIG. 7H, embodiments according to the present disclosure can include a threaded enclosure configured to be placed in a pit cover. The threaded enclosure can be attached using a nut, where the nut can include protuberances that are configured to be turned using by a technician who is wearing gloves. In some embodiments, the threads of the threaded enclosure can cover any portion of the outside surface of the enclosure (e.g., one third of the outer surface can be threaded and the rest can be unthreaded). Embodiments according to the present disclosure, including the embodiments described with reference to FIGS. 7A-7H, can provide advantages over existing devices. For example, embodiments according to the present disclosure can include an increased likelihood of attaining a 20-year battery life in a non-AC powered sensor/metering application. Embodiments according to the present disclosure can also avoid water intrusion failures in hostile outdoor environmental conditions, and/or avoid heat failures in hostile environmental conditions. Embodiments according to the present disclosure can also be configured for ease of manufacturing using volume manufacturing processes.

Furthermore, embodiments according to the present disclosure can include features for improved communications for sensor/metering applications. Non-limiting examples of improvements in the sensor/metering applications include performing multi-carrier cellular communications to avoid coverage limitations of specific carriers, and providing cellular based communications without proprietary collector infrastructure. Embodiments according to the present disclosure can also communicate across LTE network(s) to head end systems and users to report any measurements performed by the system. Some non-limiting examples of measurements that can be reported include battery life, water intrusion detection, and temperature.

Embodiments according to the present disclosure can be durable. For example, some embodiments according to the present disclosure can be rated for traffic applications and installed in roadways or other surfaces.

Additionally, embodiments of the present disclosure can be simple to install. For example, embodiments of the present disclosure can be configured to adapt to existing installation restrictions and to use existing cabling. Embodiments of the present disclosure can also be configured so that the thread spacing and nut shape/design are easy to install in the field.

Additionally, embodiments of the present disclosure can implement a network connection as part of the installation procedure. As a non-limiting example, an embodiment of the present disclosure can include a BLE radio that is configured to connect to a Bluetooth radio that is part of an installation device. Optionally, the BLE radio can be part of an LTE endpoint/transceiver that is part of the device.

The installation device can optionally be a smartphone (e.g., an Android smartphone) with a Bluetooth/BLE radio. The smartphone can include software for installing the embodiment of the present disclosure by connecting to the device using the BLE radio on the device. Installation can include sending/receiving information to/from any or all of the computing devices that are part of the present disclosure. For example, installation can include configuring a cellular radio that is part of the device using a smartphone.

Embodiments according to the present disclosure can be configured to retrofit gas registers and/or meters. With reference to FIGS. 8A-8D, an example embodiment according to the present disclosure that can be configured for gas applications.

Embodiments according to the present disclosure can include a solid-state register that can be used to replace an existing mechanical that can be calibrated and/or compensated for a particular gas meter. Alternatively or additionally, embodiments according to the present disclosure can replace an existing mechanical register display with a solid-state digital display that can be convenient to use and/or easy to read.

Figure 8A:
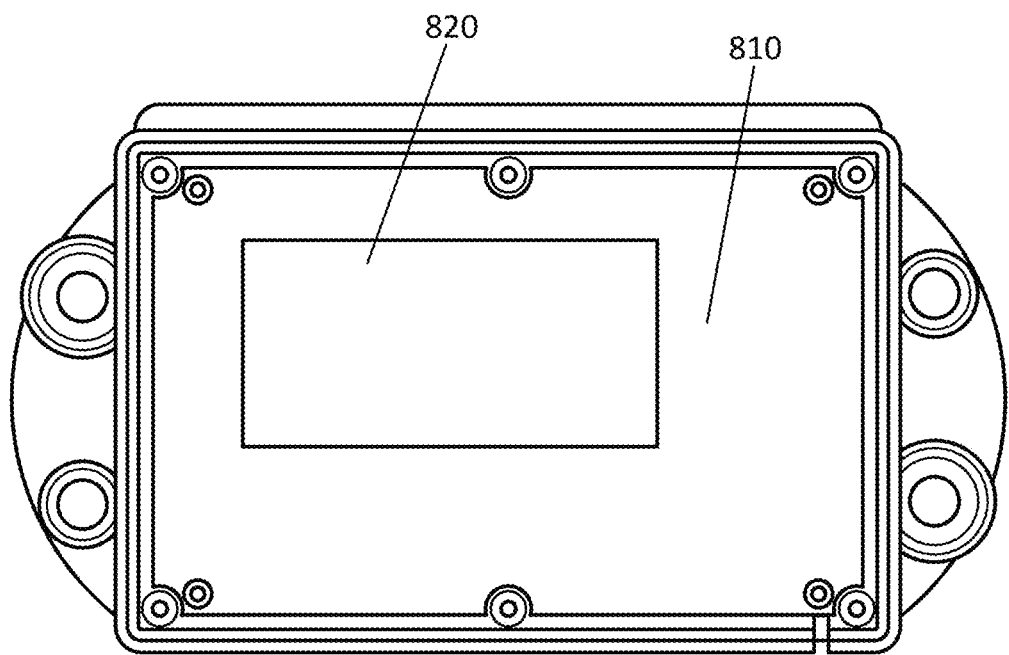
FIG. 8A, illustrates a front view of an embodiment according to the present disclosure configured to be used in gas-metering applications.

In the example embodiment shown in FIGS. 8A-8D, the example solid-state register can include two components. With reference to FIG. 8A, the first component 810 can include an electronic register including a display 820.

Figure 8B:
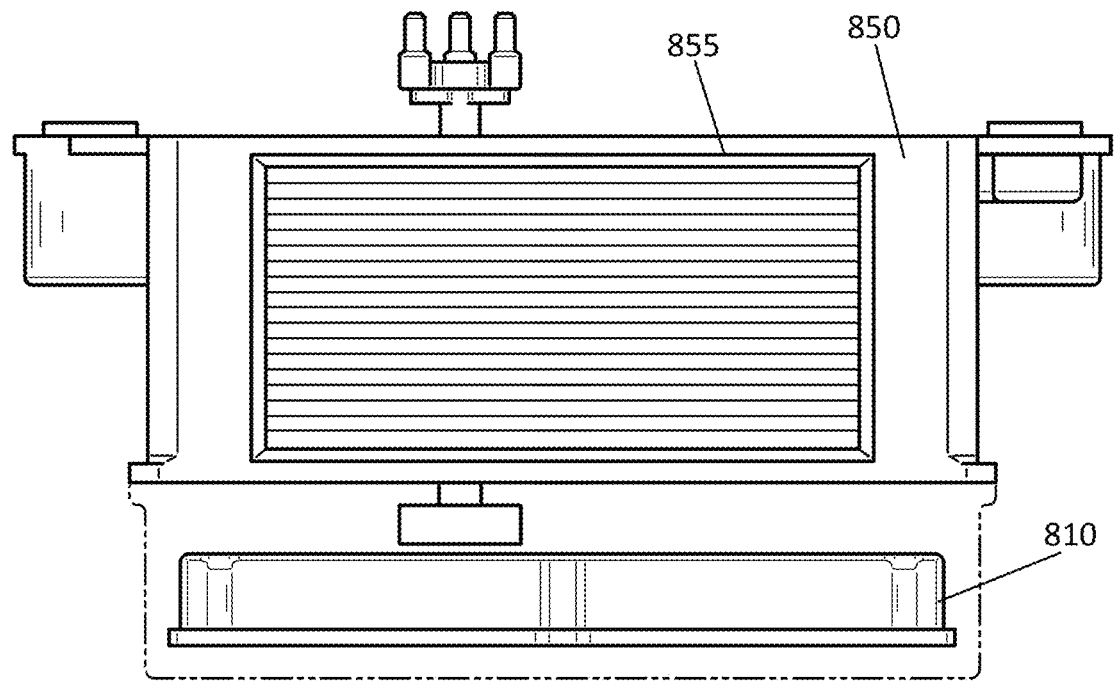
FIG. 8B illustrates a top view of the embodiment according to the present disclosure illustrated in FIG. 8A.

With reference to FIG. 8B, the second component 850 can be a base containing the power circuit (not shown), super capacitor (not shown), long-term (i.e., long-life) battery (not shown) and/or a solar panel 855. Different implementations of the first component 810 and the second component 850 can be interchangeable. For example, the second component 850 can interchangeable and configured to support any mechanical meter model.

Figure 8C:
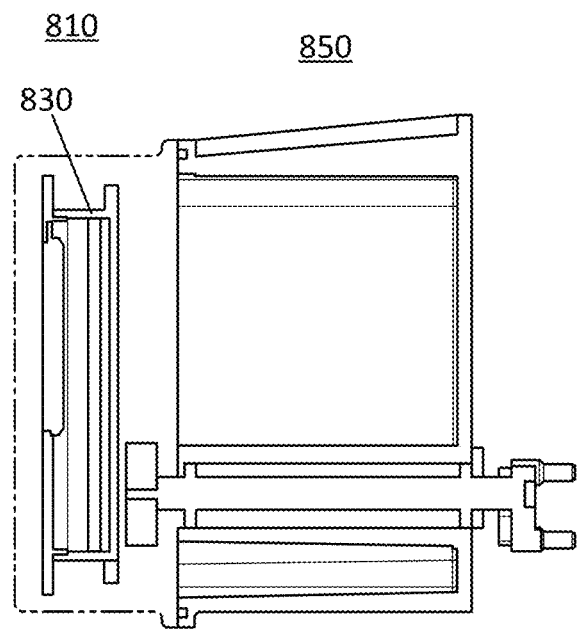
FIG. 8C illustrates a side view of the embodiment according to the present disclosure illustrated in FIG. 8A.

With reference to FIG. 8C, the first component 810 can include electronics 830. The electronics 830 can include computing electronics (e.g., the computing device 600 illustrated in FIG. 6), and/or sensor electronics. The computing and/or sensor electronics can be configured to perform measurement computations and also the data transmission.

Figure 8D:
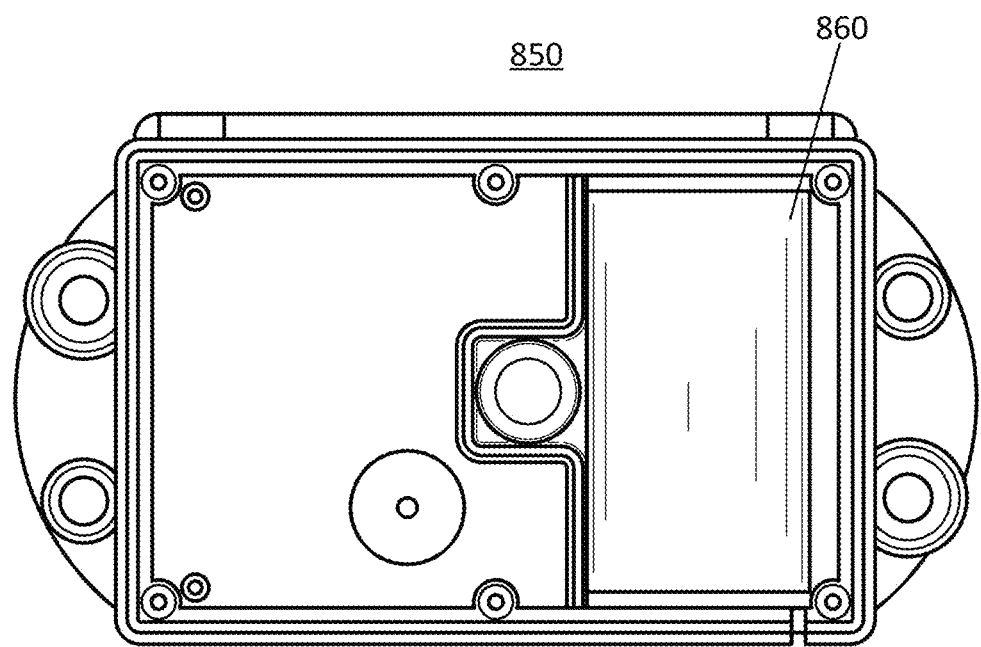
FIG. 8D illustrates a cutaway view of the embodiment according to the present disclosure illustrated in FIG. 8A.

FIG. 8D illustrates a cutaway view of the second component 850, showing a long-life battery 860 inside the second component 850.

Replacing the mechanical register with a solid-state register can increase the accuracy of the register and/or save installation time. Retrofit approaches that do not replace the original mechanical register may change the calibration of the register (e.g., by affecting drag), and may require recalibration. Additionally, retrofit approaches that do not replace the original mechanical register may require disassembling and reassembling existing mechanical registers in the field.

Figure 9:
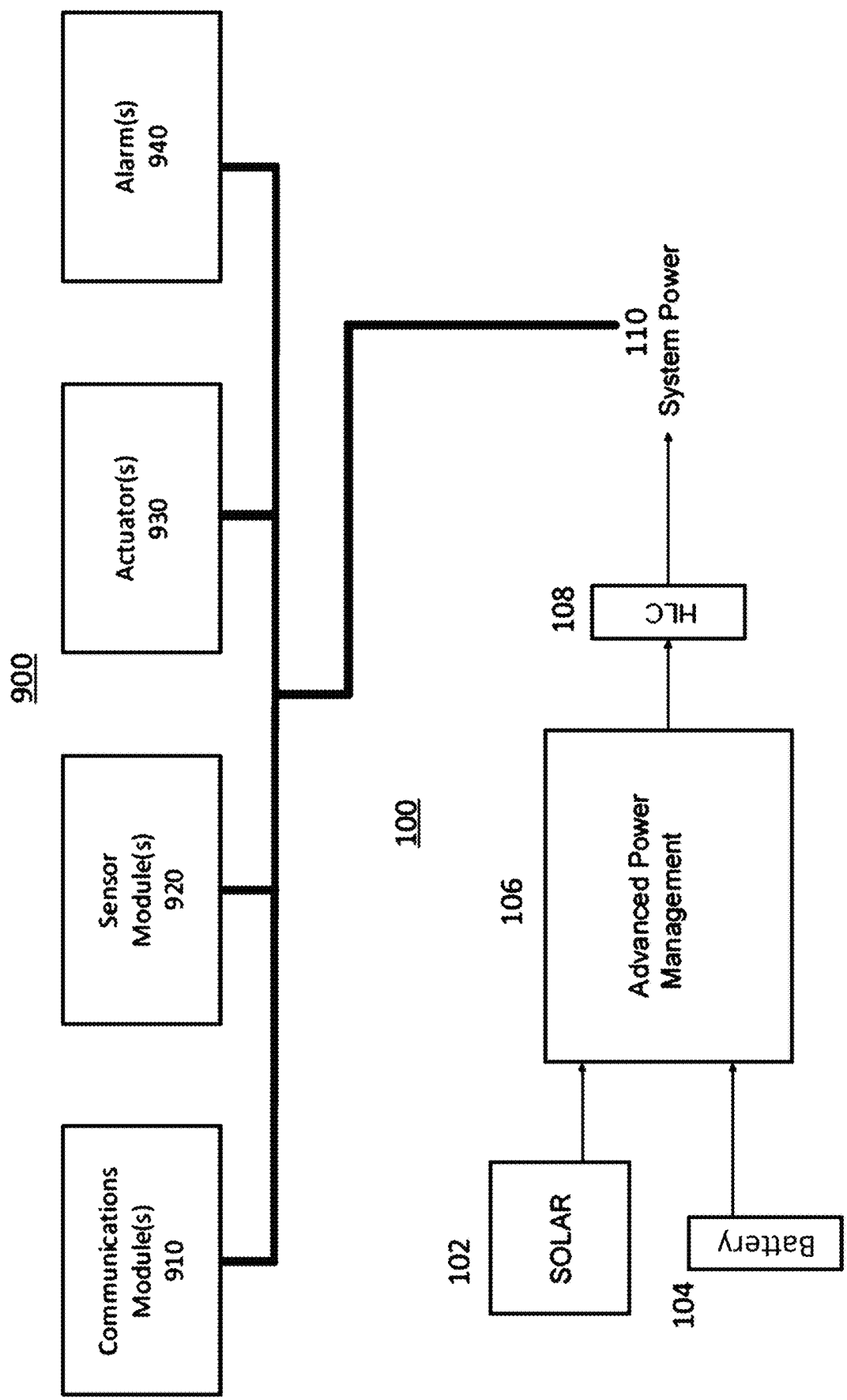
FIG. 9 illustrates a block diagram of a system including an advanced power management system, according to embodiments of the present disclosure.

With reference to FIG. 9, embodiments of the present disclosure can include systems other than metering systems. FIG. 9 includes an example system 900 including the device 100 shown and described with reference to FIGS. 1A-1C. It should be understood that the device 100 can be any of the devices described with reference to FIGS. 1A-8D.

The system power 110 output by the device can be used to optionally power any combination of components. Still with reference to FIG. 9, an example component is one or more communications modules 910. The communications module(s) can include any number of communication modules (e.g., communication modules 154 described with reference to FIG. 1B).

Another component that can be optionally used in embodiments of the system 900 is one or more sensor module(s) 920. Non-limiting examples of sensor modules 920 that can be used alone or in combination include contact sensors, flow sensors, chemical sensors, cameras, and/or microphones.

Yet another component that can be optionally used in embodiments of the system 900 is one or more actuator(s) 930. Non-limiting examples of actuators 930 include stepper motors, linear motors, solenoids, pneumatics, hydraulics, servos, and piezoelectric devices.

Another component that can be optionally used in embodiments of the system 900 include one or more alarm(s) 940. Non-limiting examples of alarms include lights and/or speakers that can be used to provide warnings. In some embodiments of the present disclosure, the alarm 940 can be operably connected to the sensor module and/or communication module. The alarm 940 can optionally be configured to output an alarm (e.g., play a sound or display a light) in response to a signal from the sensor and/or a signal from the communication module 910.

Example: Safety Systems, Security Systems, and Home Automation

An example embodiment of the present disclosure for providing safety and security can include any number of systems 900 as described with reference to FIG. 9. In some embodiments of the present disclosure can be beneficial for implementing safety and/or security systems in locations where conventional electric power from a power grid is unavailable.

Figure 10:
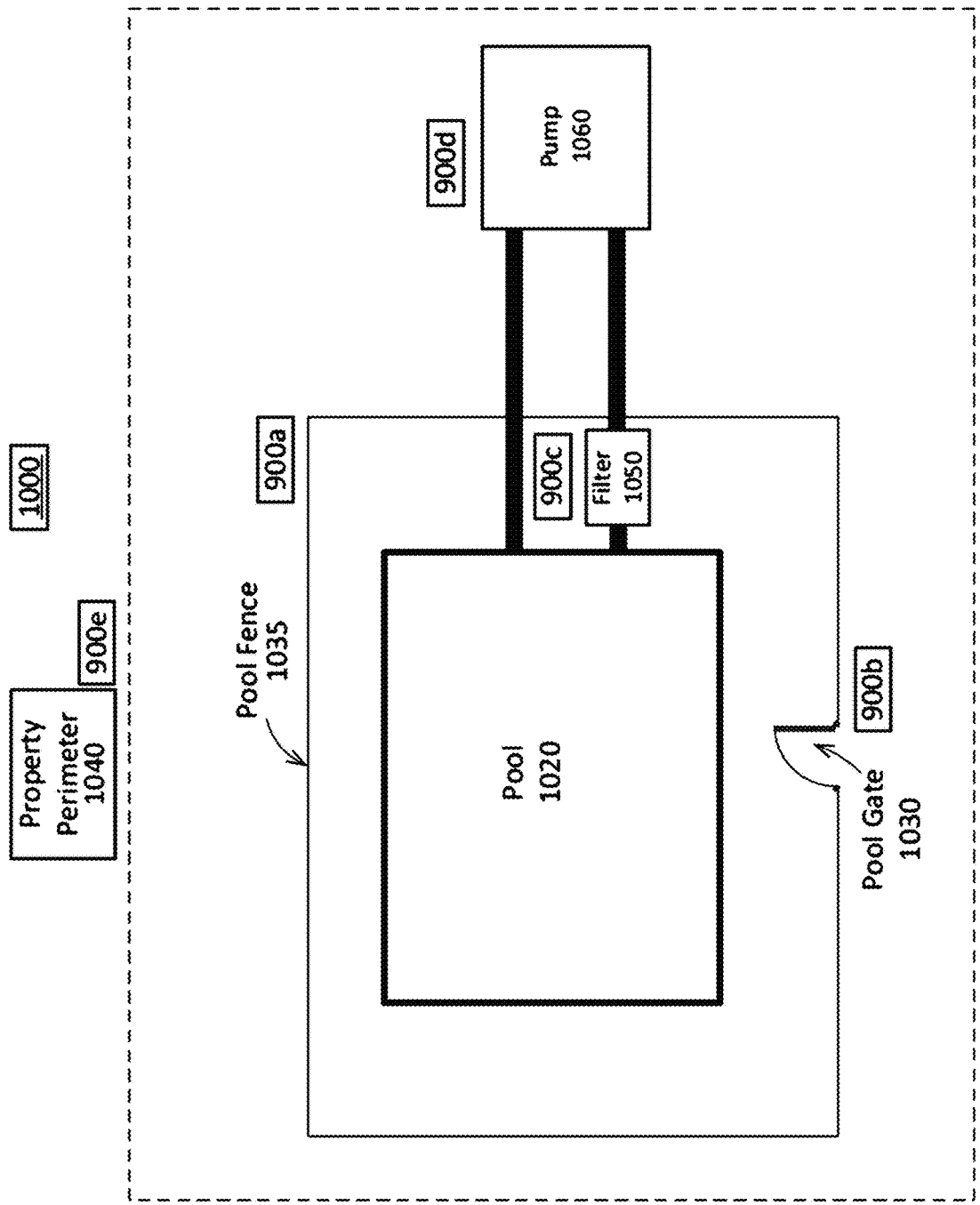
FIG. 10 illustrates an example safety, security, and home automation system according to embodiments of the present disclosure.

The safety, security, and home automation system 1000 shown in FIG. 10 includes five systems 900a, 900b, 900c, 900d, 900e.

The safety, security, and home automation system 1000 further includes a pool 1020, a pool fence 1035, a pool gate 1030 providing access to the pool 1020. The pool 1020 can include a filter 1050, and water can be circulated through the filter 1050 by a pump 1060. It should be understood that the five systems 900a, 900b, 900c, 900d, 900e are intended only as a non-limiting example, and that other systems can have fewer systems, or additional systems.

As shown in FIG. 10, the systems 900a, 900b, 900c, 900d, 900e can be spread around a property defined by a property perimeter 1040. One or more systems 900e can be located at the property perimeter 1040. As described herein, in other embodiments of a safety, security, and home automation system 1000, systems can be located near hazards like water, roadways, and power lines.

The sensor modules 920 for the systems 900 can be selected based on the location of each the systems 900a, 900b, 900c, 900d, 900e. For example, a system 900e located on the property perimeter 1040 can optionally include cameras, microphones, and contact sensors to detect when the perimeter is crossed.

As another example, system 900 located to monitor a hazard, like a pool, can include a contact sensor configured to detect when the pool is entered (e.g., by identifying waves in the pool). As another example, a pool fence 1035 can be monitored by a system 900a including sensors configured to detect when the fence is crossed (e.g., camera, microphone, contact sensors, vibration sensors, or any other sensor described with reference to FIG. 9).

Alternatively or additionally, a system 900b can be located at a pool gate 1030 in the pool fence 1035. The system 900b located at the pool gate 1030 can optionally include contact sensors configured to detect when the pool gate 1030 is opened.

The example systems 900a, 900b, 900c, 900d, 900e configured for use in a safety and/or security system can further include communication modules that can transmit the status of the safety and security system to a server, or to another device (e.g., to the cell phone of a property owner). As described herein, communication modules include cellular communications, and example implementations of the present disclosure can include transmitting data including audio and video data from the systems 900a, 900b, 900c, 900d, 900e.

Additionally, safety, security, and home automation system 1000 can be configured to control devices located outdoors like fountains, pool pumps, and sprinklers. The control and monitoring of these systems can be limited by the challenges of providing power to devices that can be near (or inside) a swimming pool or fountain, or buried in a yard. Thus, the systems and methods described herein can be used to power these devices without requiring a direct connection to mains power.

Still with reference to FIG. 10, a system 900d can be configured to monitor and control the pool pump 1060. Alternatively or additionally, a system 900c can be located at the pool filter 1050 and configured to monitor the state of the pool filter 1050. The system 900c located at the pool pump 1060 can optionally include a sensor module (e.g., any of the sensor modules 920 described with reference to FIG. 9) configured to measure the pH of the water (e.g., a pH sensor), and/or can be configured to measure the chlorination of the water (e.g., a chlorine sensor). The system 900c monitoring the pool filter 1050 can optionally include a flow sensor configured to measure flow rate through the filter and help predict clogs. One or both systems 900c, 900d can optionally include communication modules (e.g., the communication modules 910 described with reference to FIG. 9) configured to transmit information from the sensors (e.g., to a database, or to a user's computing device).

As still another example, the system 900 located at the pool pump can include an actuator 930 configured to enable or disable the pool pump, and/or to actuate valves. Optionally, the actuator 930 can be controlled by a user remotely using the communications module 910. As yet another example, the safety, security, and home automation system 1000 can optionally include alarms 940. For example, the system 900c located at the pool filter 1050 can output an alarm when the flow rate through the filter drops below a certain level. The system 900d configured to monitor and control the pool pump 1060 can optionally output an alarm when the pump is running dry, and/or when the pH or chlorination levels are dangerous.

It should be understood that the systems 900a, 900b, 900c, 900d, 900e can be deployed near, and/or operably connected to the components of the home automation and safety system 1000. For example, actuators of the systems 900a, 900b, 900c, 900d, 900e can be directly or indirectly coupled to other components of home automation and safety system 1000. As another example, sensors of the systems 900a, 900b, 900c, 900d, 900e can be coupled to other parts of the home automation and safety system 1000, or configured to remotely monitor other parts of the home automation and safety system 1000.

Figure 6:
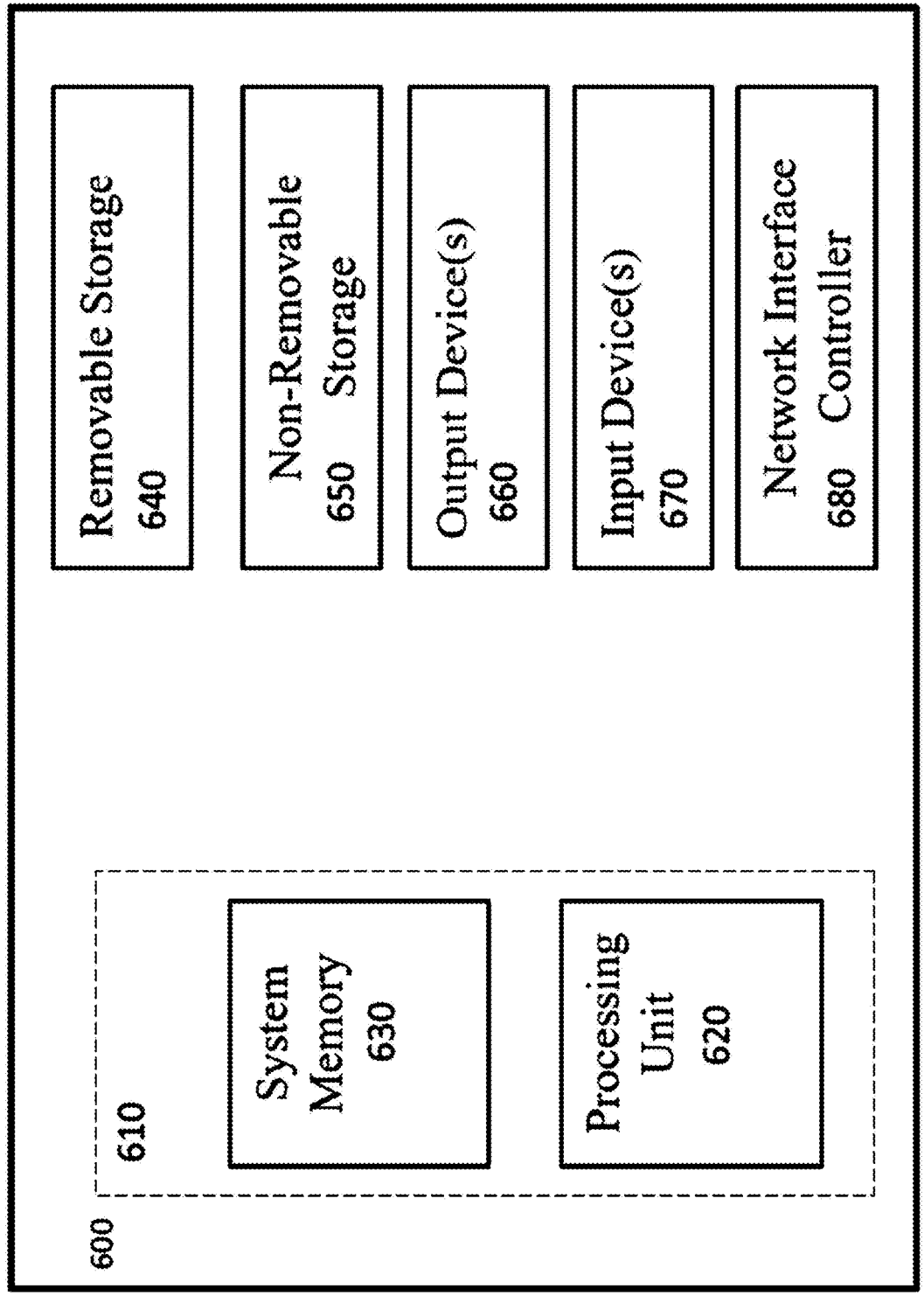
FIG. 6 is an exemplary computer system suitable for implementing several embodiments of the disclosure.

Referring to FIG. 6, an example computing device 600 upon which embodiments of the invention may be implemented is illustrated. For example, the controller system or one or more of the controller blocks described herein may each be implemented as a computing device, such as computing device 600. It should be understood that the example computing device 600 is only one example of a suitable computing environment upon which embodiments of the invention may be implemented. Optionally, the computing device 600 can be a well-known computing system including, but not limited to, cloud-based head end systems. personal computers, servers, handheld or laptop installation devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 600 to provide the functionality of a number of servers that is not directly bound to the number of computers in the computing device 600. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party Software-As-A-System (SaaS) provider.

In its most basic configuration, computing device 600 typically includes at least one processing unit 620 and system memory 630. Depending on the exact configuration and type of computing device, system memory 630 may be volatile (such as random access memory (RAM)), non-volatile (such as read-only memory (ROM), flash memory, etc.), or some combination of the two. This most basic configuration is illustrated in FIG. 6 by dashed line 610. The processing unit 620 may be a standard programmable processor that performs arithmetic and logic operations necessary for operation of the computing device 600. While only one processing unit 620 is shown, multiple processors may be present. Thus, while instructions may be discussed as executed by a processor, the instructions may be executed simultaneously, serially, or otherwise executed by one or multiple processors. The computing device 600 may also include a bus or other communication mechanism for communicating information among various components of the computing device 600.

Computing device 600 may have additional features/ functionality. For example, computing device 600 may include additional storage such as removable storage 640 and non-removable storage 650 including, but not limited to, magnetic or optical disks or tapes. Computing device 600 may also contain network connection(s) 680 that allow the device to communicate with other devices such as over the communication pathways described herein. The network connection(s) 680 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 600 may also have input device(s) 670 such as a keyboards, keypads, switches, dials, mice, track balls, touch screens, voice recognizers, card readers, paper tape readers, or other well-known input devices. Output device(s) 660 such as a printers, video monitors, liquid crystal displays (LCDs), touch screen displays, displays, speakers, etc. may also be included. The additional devices may be connected to the bus in order to facilitate communication of data among the components of the computing device 600. All these devices are well known in the art and need not be discussed at length here.

The processing unit 620 may be configured to execute program code encoded in tangible, computer-readable media. Tangible, computer-readable media refers to any media that is capable of providing data that causes the computing device 600 (i.e., a machine) to operate in a particular fashion. Various computer-readable media may be utilized to provide instructions to the processing unit 620 for execution. Example tangible, computer-readable media may include, but is not limited to, volatile media, non-volatile media, removable media and non-removable media implemented in any method or technology for storage of information such as computer readable instructions, data structures, program modules or other data. System memory 630, removable storage 640, and non-removable storage 650 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 620 may execute program code stored in the system memory 630. For example, the bus may carry data to the system memory 630, from which the processing unit 620 receives and executes instructions. The data received by the system memory 630 may optionally be stored on the removable storage 640 or the non-removable storage 650 before or after execution by the processing unit 620.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system comprising:
  a cylindrical housing comprising an inner surface and an outer surface;

a plurality of screw threads on the outer surface of the cylindrical housing;

a nut configured to attach to the plurality of screw threads, the nut comprising a plurality of protuberances;

a solar panel positioned on the outer surface of the housing;

a battery positioned inside the housing;

an advanced power management circuit positioned inside the housing, the advanced power management circuit comprising a first printed circuit board and a second printed circuit board separated by a thermoplastic insulation layer; wherein the advanced power management circuit is operably connected to the solar panel and the battery and configured to receive electrical energy from at least one of the solar panel and the battery;

a layer of overmolded material positioned in a space between the inner surface of the cylindrical housing and the first/second circuit board;

a supercapacitor positioned inside the housing and operably connected to the advanced power management circuit, wherein the supercapacitor is configured to receive electrical energy from the advanced power management circuit; and the advanced power management circuit is configured to measure a voltage of the supercapacitor; and a communications module operatively coupled to the supercapacitor.

2. The system of claim 1, wherein the supercapacitor comprises a capacitor, a hybrid layer capacitors ("HLC") and/or ultracapacitors.

3. A system comprising:

a housing comprising an inner surface and an outer surface;

a cover having an opening, the housing received in the opening and attached to the cover;

a solar panel positioned on the outer surface of the housing;

a battery positioned inside the housing;

an advanced power management circuit positioned inside the housing, the advanced power management circuit comprising a first printed circuit board and a second printed circuit board separated by a thermoplastic insulation layer; wherein the advanced power management circuit is operably connected to the solar panel and the battery and configured to receive electrical energy from at least one of the solar panel and the battery;

a capacitor positioned inside the housing and operably connected to the advanced power management circuit, wherein the supercapacitor is configured to receive electrical energy from the advanced power management circuit; and the advanced power management circuit is configured to measure a voltage of the supercapacitor; and a communications module operatively coupled to the supercapacitor.

4. The system of claim 3, further comprising a layer of overmolded material positioned in a space between the inner surface of the housing and the first/second printed circuit board.

5. The system of claim 3, wherein the housing is attached to the cover via ultrasonic welding.

6. The system of claim 3, wherein the capacitor comprises a supercapacitor, a hybrid layer capacitors ("HLC") and/or ultracapacitors.

7. A system comprising:

a housing comprising an inner surface and an outer surface;

a cover having an opening, the housing received in the opening and attached to the cover;

a solar panel positioned on the outer surface of the housing;

a battery positioned inside the housing;

an advanced power management circuit positioned inside the housing, the advanced power management circuit comprising a first printed circuit board and a second printed circuit board separated by a thermoplastic insulation layer; wherein the advanced power management circuit is operably connected to the solar panel and the battery and configured to receive electrical energy from at least one of the solar panel and the battery;

a capacitor positioned inside the housing and operably connected to the advanced power management circuit, wherein the capacitor is configured to receive electrical energy from the advanced power management circuit; and the advanced power management circuit is configured to measure a voltage of the supercapacitor; and a sensor module operatively coupled to the supercapacitor.

8. The system of claim 7, wherein the sensor module comprises at least one of a camera or a microphone.

9. The system of claim 7, wherein the sensor module comprises a contact sensor.

10. The system of claim 7, wherein the sensor module comprises a chemical sensor.

11. The system of claim 7, further comprising an actuator.

12. The system of claim 11, wherein the actuator is a servo motor.

13. The system of claim 7, further comprising a communication module operatively coupled to the supercapacitor.

14. The system of claim 13, wherein the communication module is operatively coupled to the sensor module.

15. The system of claim 14, wherein the communication module is configured to transmit information from the sensor module.

16. The system of claim 7, further comprising an alarm.

17. The system of claim 16, wherein the alarm is configured to activate based on an output of the sensor module.

18. The system of claim 16, wherein the alarm is configured to activate based on an output of the communication module.

* * * * *